(12) United States Patent
Maruyama et al.

(10) Patent No.: US 10,015,466 B2
(45) Date of Patent: Jul. 3, 2018

(54) SPATIAL INFORMATION VISUALIZATION APPARATUS, STORAGE MEDIUM, AND SPATIAL INFORMATION VISUALIZATION METHOD

(71) Applicant: KABUSHIKI KAISHA TOSHIBA, Minato-ku (JP)

(72) Inventors: Yoshihiro Maruyama, Yokohama (JP); Makoto Hatakeyama, Yokosuka (JP); Yuji Kawaguchi, Yokohama (JP); Tetsuo Endoh, Fujisawa (JP); Shohei Matsumoto, Setagaya (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 68 days.

(21) Appl. No.: 14/992,478

(22) Filed: Jan. 11, 2016

(65) Prior Publication Data

US 2016/0212402 A1 Jul. 21, 2016

(30) Foreign Application Priority Data

Jan. 15, 2015 (JP) .................................. 2015-005902

(51) Int. Cl.
*H04N 5/775* (2006.01)
*H04N 13/00* (2018.01)
*H04N 13/02* (2006.01)
*G01C 15/00* (2006.01)

(52) U.S. Cl.
CPC ....... *H04N 13/0018* (2013.01); *G01C 15/002* (2013.01); *H04N 13/0217* (2013.01)

(58) Field of Classification Search
None
See application file for complete search history.

(56) References Cited

U.S. PATENT DOCUMENTS

| 2004/0066500 A1* | 4/2004 | Gokturk | G01C 11/30 356/4.01 |
| 2005/0166413 A1* | 8/2005 | Crampton | B25J 13/088 33/503 |
| 2014/0380161 A1 | 12/2014 | Chin et al. | |

FOREIGN PATENT DOCUMENTS

| CN | 104238873 | 12/2014 |
| FR | 2 987 438 A1 | 8/2013 |
| JP | 2012-68047 | 4/2012 |

OTHER PUBLICATIONS

Extended European Search Report dated Jul. 5, 2016 in Patent Application No. 16151142.3.

* cited by examiner

*Primary Examiner* — Eileen M Adams
(74) *Attorney, Agent, or Firm* — Oblon, McClelland, Maier & Neustadt, L.L.P.

(57) ABSTRACT

A spatial information visualization apparatus in an embodiment includes a storage, a vacant space processor, a spatial information generator, and an image generator. The storage stores design dimensions of a target space, and measurement information indicating coordinates of a measurement point of the target space measured by scanning the target space from a plurality of different reference points in the target space, for each of the reference points. The vacant space processor specifies a vacant space existing in the measured space stored in the storage, on the basis of the coordinates of the measurement point of the target space included in the measurement information read for each of the reference points from the storage, coordinates of the reference point, and the design dimensions of the space.

18 Claims, 26 Drawing Sheets

IMAGE OF VISUALIZED y-z PLANE

: MEASURED SPACE

: VACANT SPACE

: RANGE INCLUDING VACANT SPACE AND UNMEASURED SPACE

FIG. 13C
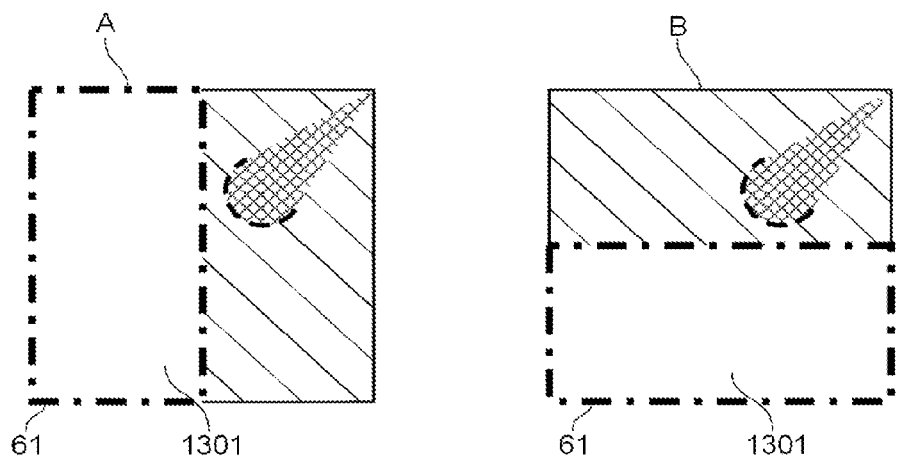
FIG. 14A
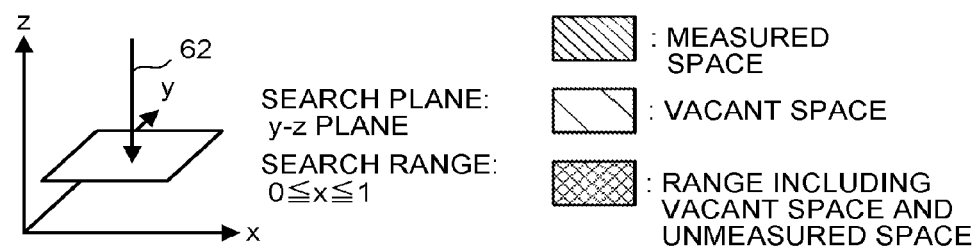
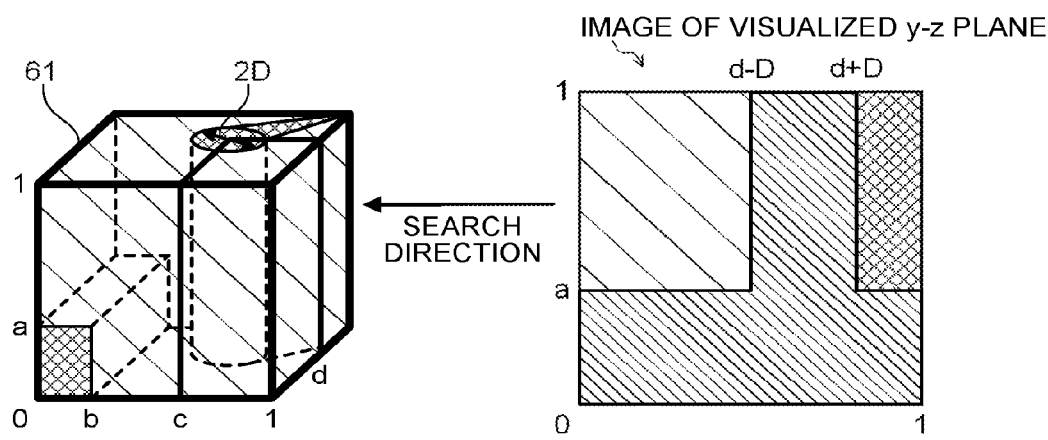

FIG. 21
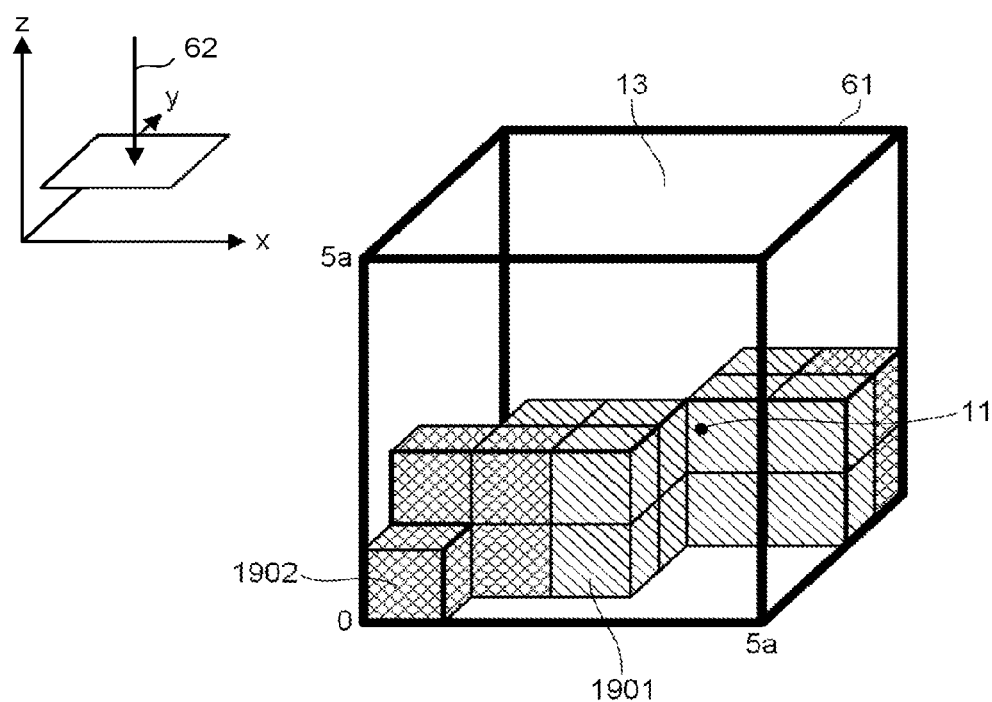
 : CELL OF MEASURED SPACE
 : CELL OF UNMEASURED SPACE

SPATIAL INFORMATION VISUALIZATION APPARATUS, STORAGE MEDIUM, AND SPATIAL INFORMATION VISUALIZATION METHOD

CROSSREFERENCE TO RELATED APPLICATION

This application is based upon and claims the benefit of priority from the prior Japanese Patent Application No. 2015-005902, filed on Jan. 15, 2015; the entire contents of which are incorporated herein by reference.

FIELD

Embodiments described herein relate generally to a spatial information visualization apparatus, a storage medium, and a spatial information visualization method.

BACKGROUND

In a facility (plant) having a large and complicated structure such as a nuclear power plant, a non-contact type three-dimensional measuring device such as a 3D laser scanner or a 3D reconfiguration technique using an image acquires data on a laser radiation surface (as build data) from an existing building structure and thereby measures a range of a wall surface of the existing building structure, and a plan of reconstructing and additionally installing an instrument and a plan of loading an instrument are performed.

Such a three-dimensional measuring device can simultaneously acquire lots of data by radiating laser to the surroundings while rotating the 3D laser scanner installed at a base point when measuring an object to be measured.

However, it is difficult to measure a three-dimensional surface shape of the entire object to be measured by measuring at one time because a shadowed portion is made.

Therefore, measurement is performed several times with the base point changed by changing the position of the 3D laser scanner, and obtained measured data measured from a plurality of positions are overlapped to decrease as much as possible the shadowed portion, thereby obtaining data in a three-dimensional surface shape (three-dimensional data).

Conventionally, there is a three-dimensional CAD technique of creating engineering data of the facility existing in the large and complicated structure by forming a three-dimensional CAD model using the thus acquired three-dimensional data.

As an application example of the three-dimensional CAD technique, for example, a three-dimensional CAD model creating system is disclosed which can automatically acquire design specification data on various plant instruments and easily correct a design three-dimensional CAD model.

Incidentally, in the facility in the large and complicated structure, it is necessary to grasp not only the shape of a partitioned wall surface in the facility but also the place of a physical body or an instrument existing therein, a vacant space, the workability in the surroundings, and the accessibility of a remote-operated robot, especially under an environment which a person hardly enters. In this case, it is important to efficiently and early specify the existence of space.

The above-described conventional technique of creating the three-dimensional CAD model can specify the position of the space to some extent.

However, accurate data cannot be created unless engineering information of all facilities in a search object range is combined. Therefore, the operation of combining the engineering information will take huge amount of time.

Besides, for a region which has not been scanned, its shape is presumed by manual operation, resulting in variations in quality of completed three-dimensional data depending on the experience and skill of an operator.

In addition, the details of the operation of creating the three-dimensional data is not remained as an operation result, so that when an actual state differs from the model, review becomes required for the operation of correcting the presumed shape and a reconstructing and additional construction plan and an instrument loading plan associated therewith.

As described above, in the conventional three-dimensional CAD model creating system, it is difficult to accurately express the space measured by the three-dimensional measuring device in a short time.

BRIEF DESCRIPTION OF THE DRAWINGS

FIG. 13C is a view of the planar image projected made by projecting the search range.

FIG. 14A is a view illustrating a space for which a passing route of an object is examined.

FIG. 21 is a view illustrating setting of a search direction and a search range in the measuring range.

DETAILED DESCRIPTION

Figure 1:
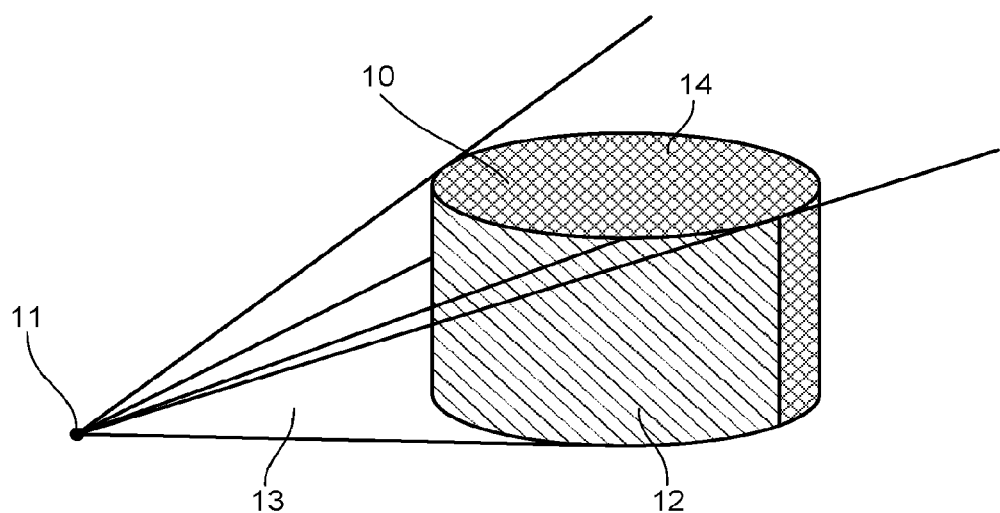
FIG. 1 is a view illustrating definitions of a "measurement part" and a "vacant space" in a measurement range.

A spatial information visualization apparatus in an embodiment includes a storage, a vacant space processor, a spatial information generator, and an image generator. The storage stores design dimensions of a target space, and measurement information indicating coordinates of a measurement point of the target space measured by scanning the target space from a plurality of reference points in the target space, for each of the reference points. The vacant space processor specifies a vacant space existing in the measured space stored in the storage, on the basis of the coordinates of the measurement point of the target space included in the measurement information read for each of the reference points from the storage, coordinates of the reference point, and the design dimensions of the space. The spatial information generator generates spatial information for classifying the target space into the measured space, the vacant space, and an unmeasured space ranging from the design dimensions of the target space to the measurement point of the target space. The image generator generates a stereoscopic image or a planar image of at least the vacant space in the spatial information visually distinguished from the measured space and/or the unmeasured space in the spatial information.

Hereinafter, embodiments will be described in detail referring to the drawings.

First, the definitions of terms of a space in which a physical body exists will be explained referring to FIG. 1. As illustrated in FIG. 1, laser is radiated from a certain measurement point (hereinafter, referred to as a "measuring position 11") to the surroundings, and a position of a obstacle 10 or a wall surface on which the laser impinges is measured.

A measured space 12 is a portion where the laser impinges on the obstacle 10. A vacant space 13 is a range where the obstacle 10 does not exist between the measuring position 11 and the measured space 12. An unmeasured space 14 is a range, which is a distal portion of the obstacle 10 on which the laser impinges, where measurement is not performed. The distal portion means the inside of the obstacle 10 and a portion (a laser unreached portion) of the obstacle 10 on the side opposite to the measured space 12.

First Embodiment

A first embodiment of a spatial information visualization system will be described referring to FIG. 2.

Figure 2:
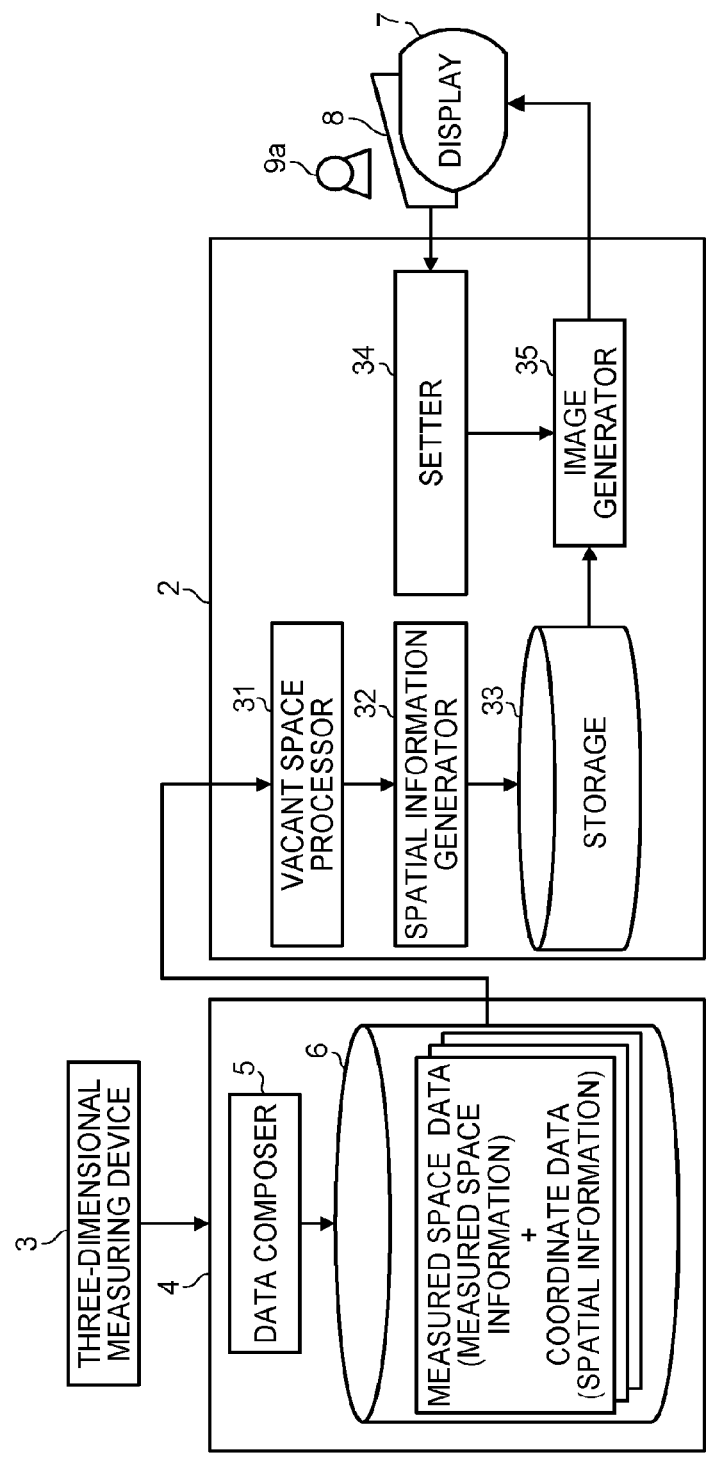
FIG. 2 is a block diagram illustrating the configuration of a first embodiment of a spatial information visualization system.

As illustrated in FIG. 2, the first embodiment has a personal computer 2 (hereinafter, referred to as a "PC2") as the spatial information visualization apparatus and a computer, a three-dimensional measuring device 3 as a space scanner, a three-dimensional data processing device 4, a display 7 and an input device 8 which are connected to the PC 2 and so on.

The three-dimensional measuring device 3 is, for example, a 3D laser scanner and measures time from when laser is radiated until when the laser returns, to thereby measure a surface of a structure being a measurement object by non-contact measuring and acquire measured data for calculating the position and the shape of the surface of an objective structure.

The three-dimensional measuring device 3 measures the distance to the surface of the structure being the measurement object on the basis of its own reference position by non-contact measuring to acquire the measured data (for example, point group data). Note that a position (x, y, z coordinates) on a three-dimensional space of the structure being the measurement object can be calculated from a radiation angle of the laser from the reference position to a fixed direction.

As the three-dimensional measuring device 3, an instrument using, for example, directional electromagnetic waves including light to a radio wave and an ultrasonic wave as a transmission source may be used other than the 3D laser scanner. Further, the three-dimensional measuring device 3 may be an instrument using a technology such as stereo vision that performs three-dimensional measuring from video imaged from different angles by a plurality of cameras.

The three-dimensional data processing device 4 has a composer 5 and a data base 6 (hereinafter, referred to as a "DB 6"). The composer 5 converts measured data at different measuring positions obtained by the three-dimensional measuring device 3 into the same coordinate system, composes the converted data to generate three-dimensional shape data, and stores it in the DB 6.

The DB 6 stores the measurement data measured at each reference position by the three-dimensional measuring device 3, the coordinate data (measuring information), and three-dimensional shape data (spatial information) of the space obtained by converting and synthesizing the coordinate systems of these data.

More specifically, the DB 6 is a storage that stores design dimensions of a target space, and measurement information indicating the coordinates of the measurement point of the target space measured by the three-dimensional measuring device 3 disposed at different reference positions (reference points) in the target space, for each of the reference points.

The PC 2 reads the measurement data that is stored in advance in the DB 6 of the three-dimensional data processing device 4, and displays the data on the display 7. In other words, the display 7 displays the measurement data read by the PC 2 from the DB 6 of the three-dimensional data processing device 4, a classification result in the measuring range, and other data. The display 7 is, for example, a monitor.

The input device 8 is, for example, a keyboard, a mouse or the like, and besides, may be, for example, a touch panel or the like. The input device 8 is a device that performs setting input and input operation of the PC 2. The input device 8 inputs, into the PC 2, an instruction about a numerical value and a direction for setting, for example, a search direction (search plane) and a search range in the measuring range.

The search direction means a direction for projecting a three-dimensional space onto a two-dimensional plane, and is, for example, a direction of a plane such as an x-y plane, a y-z plane, or a z-x plane. The search range is a direction normal to the plane being a search object, for example, in the case of the x-y plane (the floor of a building), a range of a vertical height, and it will be designated to be 0.15 m to 2.5 m above the floor or the like.

Note that the input device 8 may be a device that reads a file composed of information on the search direction and the search range and stored in advance in a memory or the like as input information.

The PC 2 includes a storage device such as a memory and a hard disk drive, an arithmetic unit such as a CPU, a network interface (LAN interface or the like) for data transfer (communication) to/from the three-dimensional data processing device 4 and other computers, an input/output interface for connecting external devices (the display 7 and the input device 8) and so on.

In the PC 2, software (spatial information visualization program) installed in the hard disk drive determines the vacant space 13 in the target space being the measurement object and makes the vacant space 13 into data, sets the search direction and the search range, visualizes the target space and so on, using the three-dimensional shape data stored in the three-dimensional data processing device 4.

The PC 2 has, as a functional configuration of the software (spatial information visualization program), a vacant space processor 31, a spatial information generator 32, a storage 33, a setter 34, a image generator 35 and so on.

The vacant space processor 31 specifies the vacant space 13 (second range) existing in the range of the measured space 12 that is a first range which has been measured, on the basis of the coordinates of the measured point of the target space included in the measurement information, the coordinates of the spatial information (reference position (reference point)), and the design dimensions of a contour of the target space, read for each reference point from the DB 6. Note that the measured space 12 is called a first range, the vacant space 13 is called the second range, and the unmeasured space 14 is called a third range.

Explaining in more detail, the vacant space processor 31 generates a trajectory of laser radiation linking the coordinates of the measured space 12 of the target space included in the measurement information and the coordinates of the reference position (reference point) read for each reference point from the DB 6, specifies a space through which the generated trajectory has passed, and obtaining a sum set of the specified spaces to thereby specify the range in which the spaces exist, as a vacant space.

The spatial information generator 32 imparts attribute information (a flag or tag) of the vacant space 13 (second range) specified by the vacant space processor 31, the measured space 12 (first range), and the unmeasured space 14 (third range) to the three-dimensional shape data, and stores the resulting data in the storage 33.

More specifically, the vacant space processor 31 and the spatial information generator 32 function as a spatial information generator that generates spatial information in which the measured space 12 (first range), the vacant space 13 (second range) existing in the range of the measured space 12 (in the first range), and the unmeasured space 14 (third range) from the design dimensions of the target space to the measurement point of the space are distinguished from one another, on the basis of the coordinates of the measurement point of the target space included in the measurement information, the coordinates of the reference position (reference point), and the design dimensions of a contour of the target space, read for each reference point from the DB 6. The design dimensions of the contour of the target space mean, for example, inside dimensions of a room in the case of a room, and dimensions of a wall surface and a pillar in the case of a passageway.

The storage 33 stores the three-dimensional shape data to which the attribute information such as the measured space 12, the vacant space 13, and the unmeasured space 14 is imparted.

The setter 34 sets search parameters such as the search range and the search direction inputted or designated from the input device 8, in the memory or the like.

The image generator 35 reads the search parameters set in the memory or the like by the setter 34 and the spatial information, and partially takes out the three-dimensional shape data (spatial information) or projects the three-dimensional shape data (spatial information) on a predetermined plane according to the search range and the search direction (search plane).

The image generator 35 generates a spatial image (referred also to as a stereoscopic image or a 3D image) or a planar image (referred also to as a 2D image) in which at least the vacant space 13 among the measured space 12, the vacant space 13, and the unmeasured space 14 is visually distinguished from the other ranges, from the partially taken out three-dimensional shape data (spatial information) or the two-dimensional shape data (planar information) projected on the predetermined plane.

In other words, The image generator 35 has a function of generating a spatial image or a planar image of at least the vacant space 13 in the spatial information visually distinguished from the measured space 12 and/or the unmeasured space 14 in the spatial information.
in which at least the vacant space 13 among the measured space 12, the vacant space 13, and the unmeasured space 14 included in the three-dimensional shape data (spatial information) is visually distinguished from the other ranges.

A designer 9a confirms the image on the screen of the display 7 visualized by the PC 2, and determines the state of an object settling in the space or the plane of the confirmed image and whether or not a person or an instrument can pass therethrough.

Figure 3:
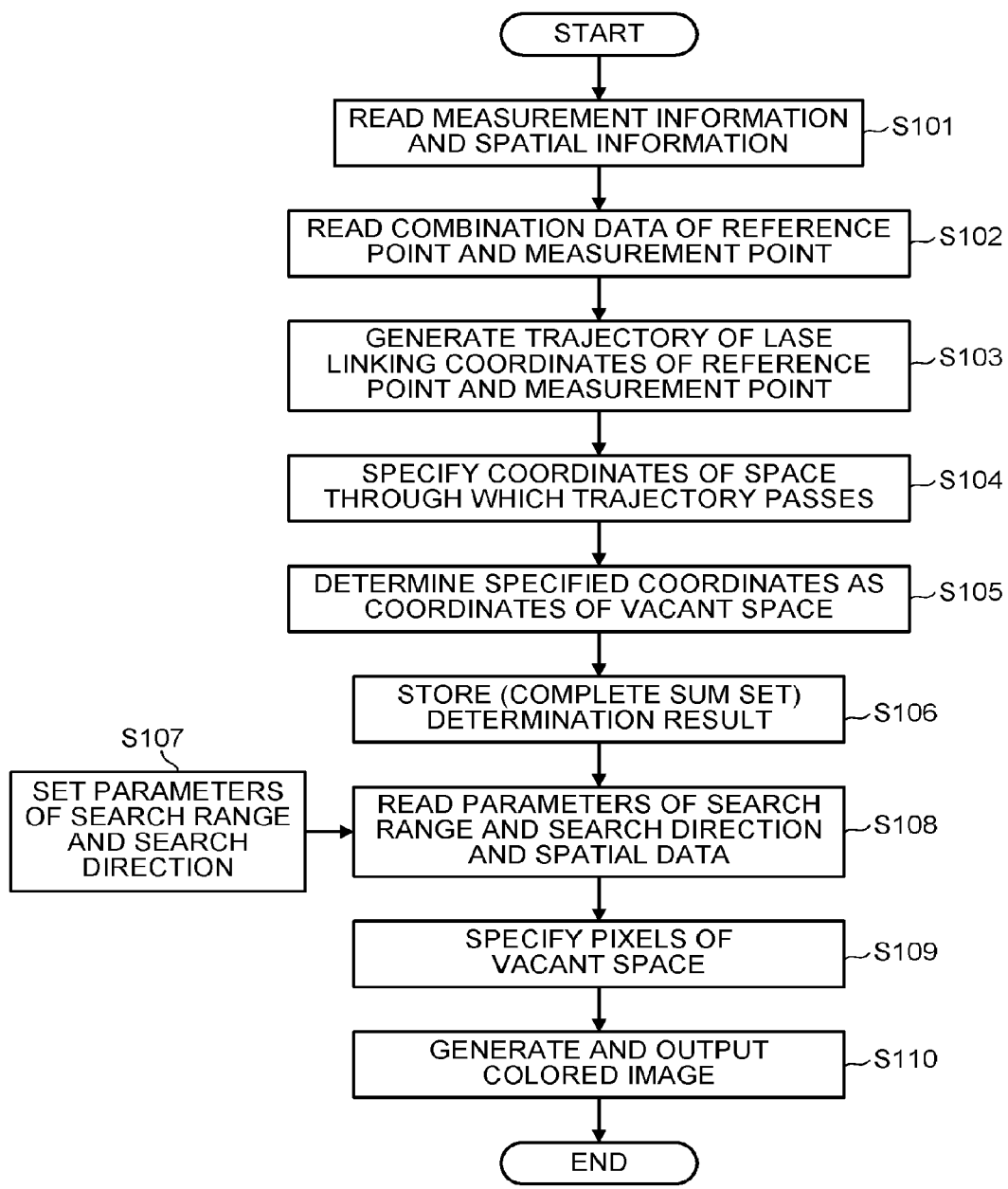
FIG. 3 is a flowchart illustrating an operation in the first embodiment.

Hereinafter, a processing operation in the first embodiment will be described referring to FIG. 3 to FIG. 14. FIG. 3 is a flowchart of making the space into data from the three-dimensional shape data until visualizing it to determine the state of an object settling in the space and whether or not the object can pass therethrough.

In the PC 2, the vacant space processor 31 reads the measurement data and the coordinate data (measuring information) and the three-dimensional shape data (spatial information) (Step S101).

Subsequently, the vacant space processor 31 reads combination data of the coordinates of the reference position (reference point) and the measurement point (Step S102), and generates the trajectory of laser linking the reference position (reference point) and the measurement point (Step S103).

The trajectory may be one line or may be a shape (conical shape or the like) having a width in consideration of diffusion of the laser.

The vacant space processor 31 specifies the coordinates of the space (clearance or empty space) on the three-dimensional shape data (spatial information) through which the generated trajectory passes (Step S104). The vacant space processor 31 adds the attribute information (a flag or tag) such as the vacant space to the pixel (coordinate data) positioned at the specified coordinates.

The vacant space processor 31 performs the coordinate specifying operation sequentially for other measurement points, determines the range surrounded by the coordinates of the specified spaces as a vacant space (Step S105), and stores (completes a sum set) the determination result in the storage 33 (Step S106).

Figure 4A:
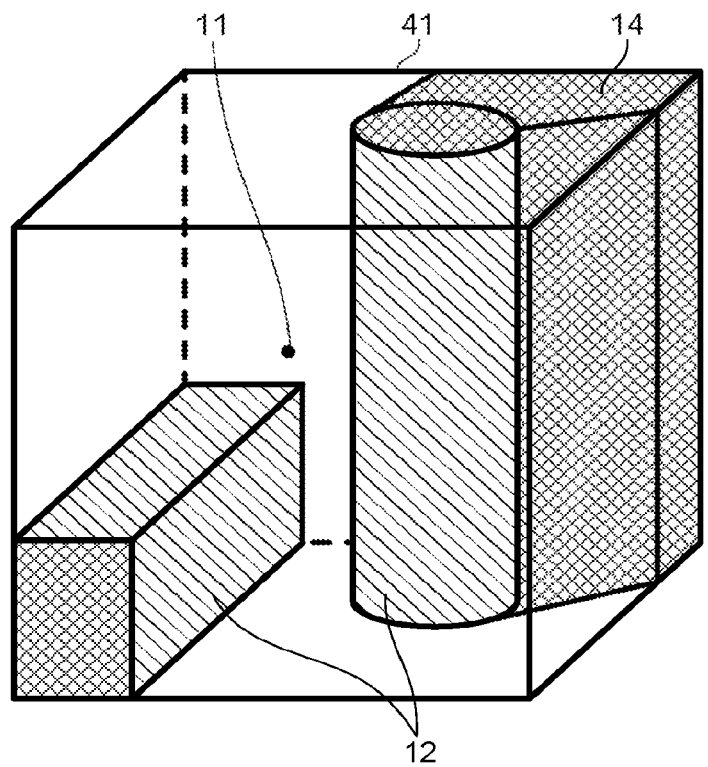
FIG. 4A is a view illustrating a measurement range and a measuring position.
Figure 4B:
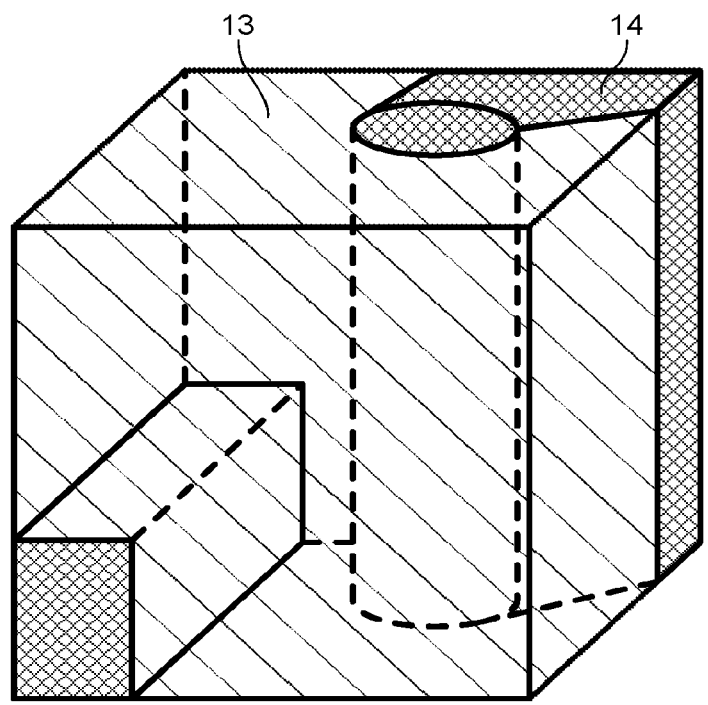
FIG. 4B is a view illustrating a range determined as a vacant space.

More specifically, the vacant space processor 31 uses the three-dimensional shape data (spatial information) measured from a certain measuring position 11 in a measuring range 41 as illustrated in FIG. 4A, and determines a range from the measuring position 11 to the measured space 12 measured in a non-contact manner as the vacant space 13 as illustrated in FIG. 4B.

Further, the vacant space processor 31 makes the determined vacant space 13 into data, namely, imparts attribute information as the vacant space 13 to a corresponding part of the three-dimensional shape data (spatial information).

Figure 5A:
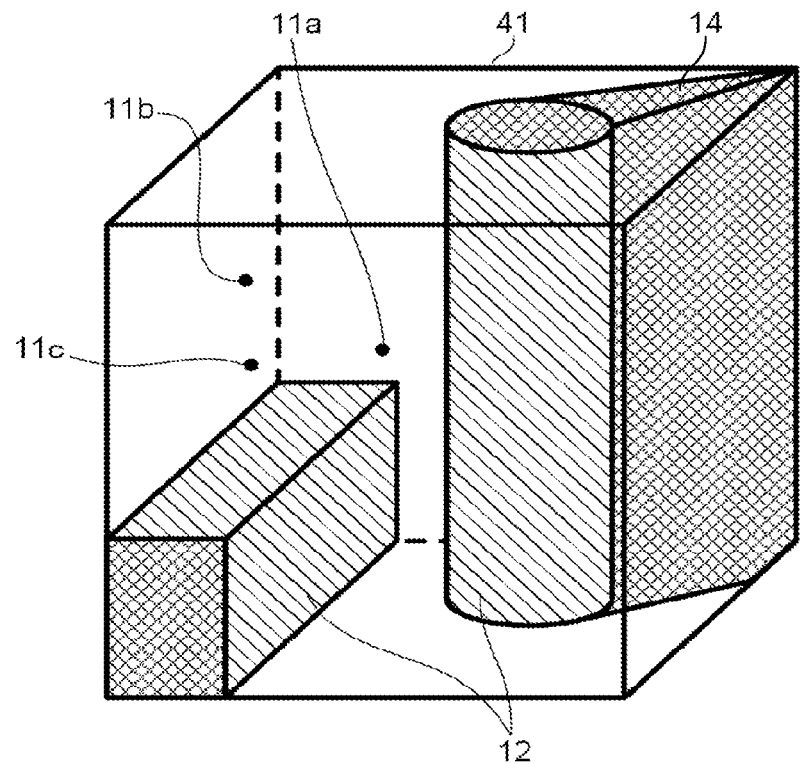
FIG. 5A is a view illustrating an unmeasured range decreased by measuring from a plurality of measuring positions.
Figure 5B:
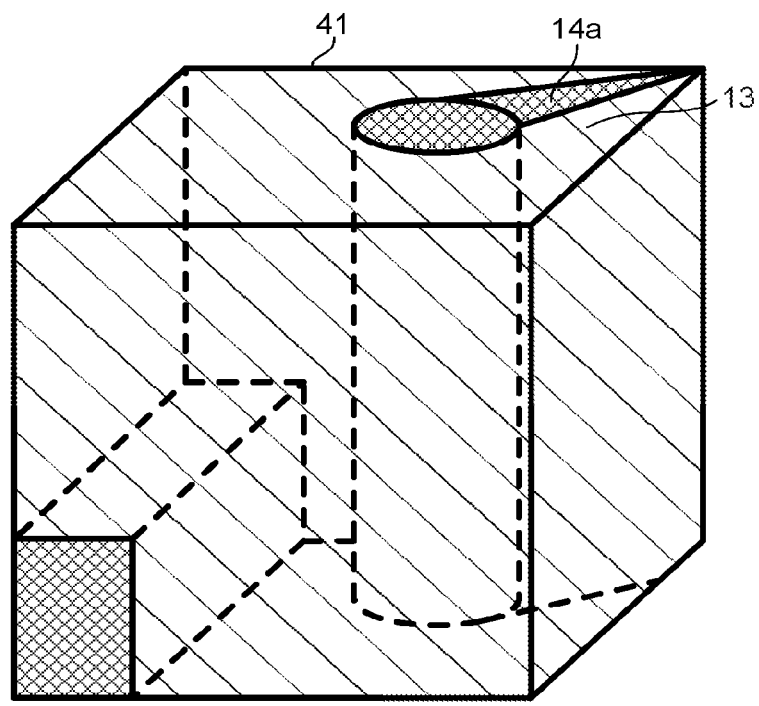
FIG. 5B is a view illustrating that a range to be determined as the vacant space is increased.

Note that as illustrated in FIG. 5A, by obtaining spaces on the three-dimensional shape data (spatial information) through which trajectories generated using measured data measured from a plurality of different measuring positions 11a to 11c in the measuring range 41 pass, an unmeasured space 14a is reduced as illustrated in FIG. 5B. In this manner, the region determined as the vacant space 13 can also be increased.

In the case of visualizing the three-dimensional shape data (spatial information) to which the information of the vacant space 13 is imparted, the search range and the search direction (search plane) are designated and set.

In this case, when the designer 9a inputs, for example, values of the width, height depth, position and the like as parameters of the search range from the input device 8, designates and inputs, for example, the x-y plane as a parameter of the search direction, and sets the search range and the search direction in the PC 2 (Step S107), The image generator 35 in the PC 2 reads the parameters of the search range and the search direction and the three-dimensional shape data (spatial information) (Step S108), and decides the search range and the search direction in the three-dimensional shape data (spatial information).

Figure 6:
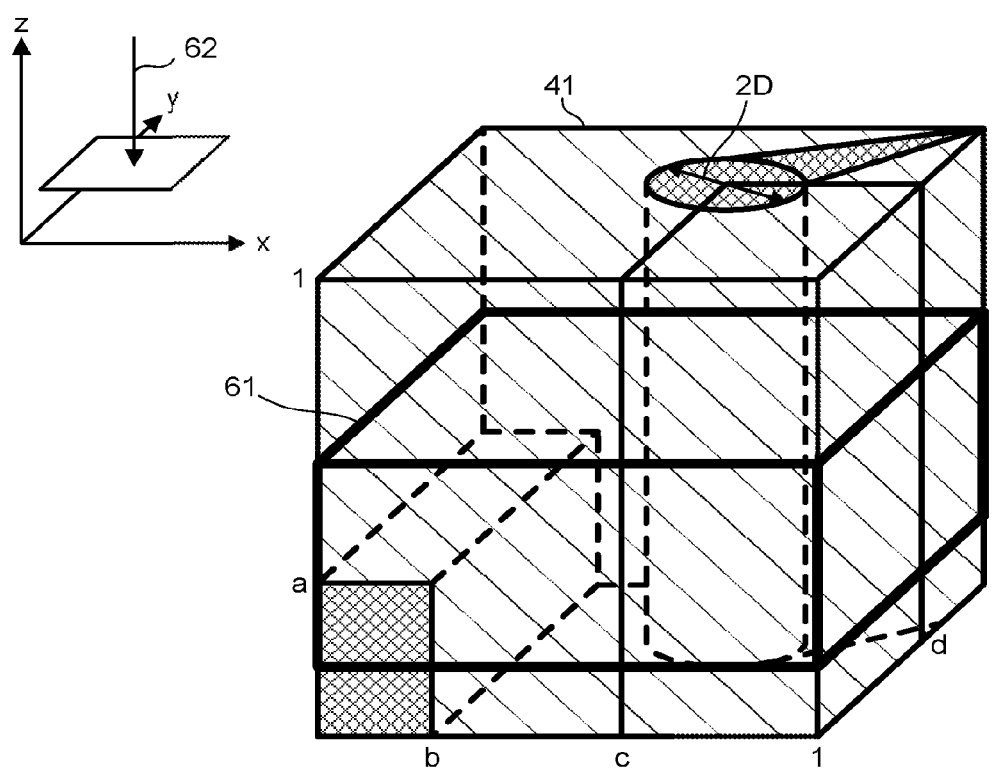
FIG. 6 is a view illustrating a search direction and a search range in a measuring range.

Here, for example, as illustrated in FIG. 6, the x-y plane in a designated search direction 62 is set regarding the measuring range 41, and a search range 61, for example, the height is set along a direction normal to the x-y plane. Here, the search direction 62 is a direction normal to the set plane. Further, the search range 61 is a range along the search direction 62 (the direction normal to the set x-y plane) in the measuring range 41, and the range can be arbitrarily set.

Note that a symbol 2D in the drawing represents a diameter of a cylindrical shield. A symbol a represents the height of a rectangular parallelepiped shield. A symbol b represents the width of the rectangular parallelepiped shield. A symbol c represents the position on the x-axis of the cylindrical shield. A symbol d represents the position on the y-axis of the cylindrical shield.

The image generator 35 obtains a product set of the vacant space 13 in the decided search direction 62 to thereby calculate the place (width) of the vacant space 13 along the search direction 62 in the search range 61, and specifies pixels being the vacant space 13 in the planar image made by projecting the place (width) in the search direction 62 (Step S109).

The image generator 35 generates an image in which the measured space 12, the vacant space 13, and the unmeasured space 14 are differently colored (colored with different colors) for the space in the search range, on the basis of the thus specified pixels.

The image generator 35 outputs the generated image to the display 7 (Step S110) to display the colored image on the screen of the display 7 to thereby visualize it.

Note that when the vacant space 13 and the unmeasured space 14 exist in the search direction 62, they are visualized as a "range 1001 including the vacant space and the unmeasured range" according to the ratio of the vacant space 13 and the unmeasured space 14 (see FIG. 10B), and are thereby distinguished from the other range (the measured space 12 or the like). For the measured space 12, a measured space 71 in which a measurement point exists will be drawn with a color different from those of the other ranges for visualization, and thereby distinguished from the other ranges.

Figure 7A:
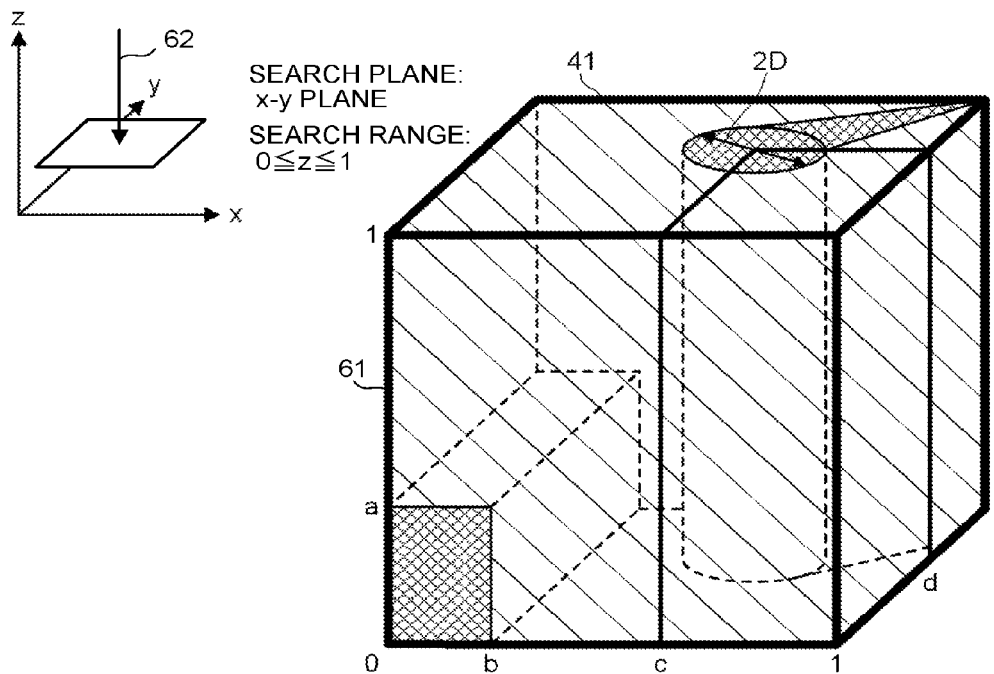
FIG. 7A is a view illustrating a classification result (a stereoscopic image) in a search range of an "x-y plane $(0 \leq z \leq 1)$".
Figure 7B:
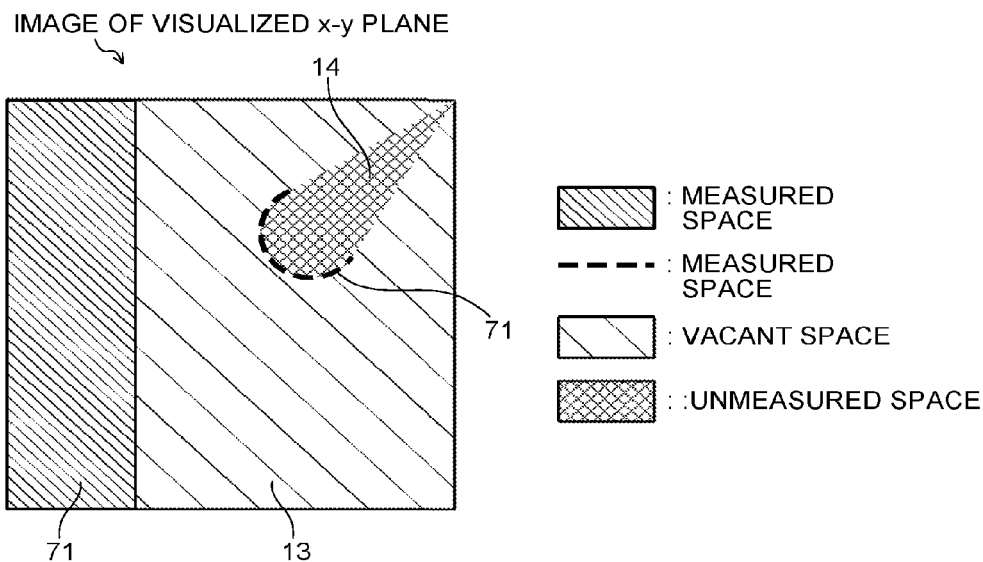
FIG. 7B is a view illustrating a planar image made by visualizing a space in the search range of the "x-y plane $(0 \leq z \leq 1)$".

FIG. 7A is an example of a stereoscopic image with the search direction 62 set in the direction normal to the x-y plane and the search range 61 set to $0 \leq z \leq 1$ regarding the measuring range 41, and FIG. 7B is an example of a planar image made by projecting the stereoscopic image of FIG. 7A in the search direction and thereby visualizing it.

Figure 8A:
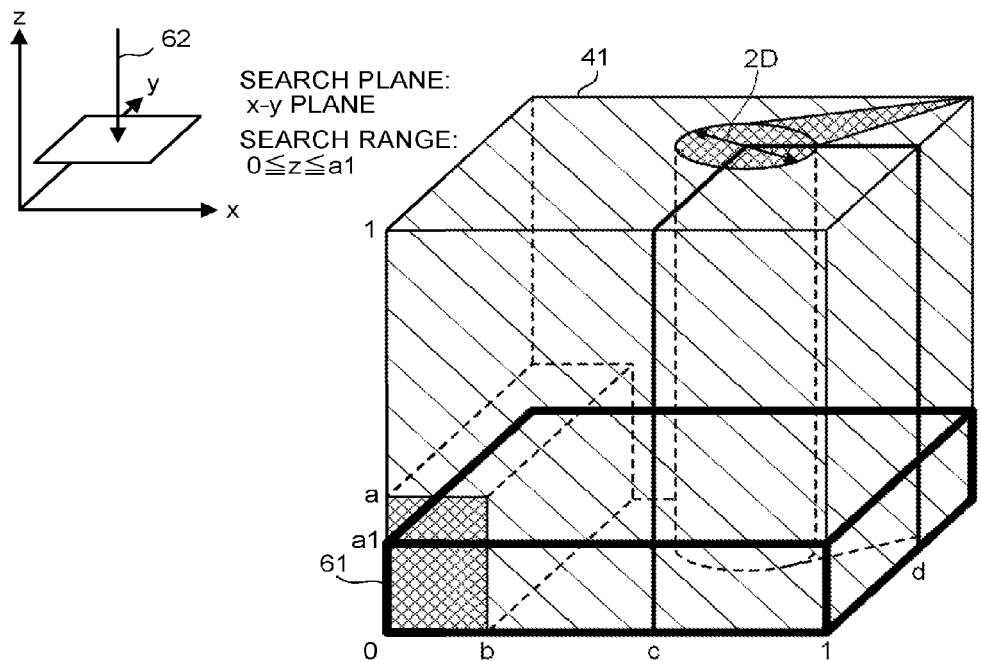
FIG. 8A is a view illustrating a classification result (a stereoscopic image) in a search range of an "x-y plane $(0 \leq z \leq a1)$".
Figure 8B:
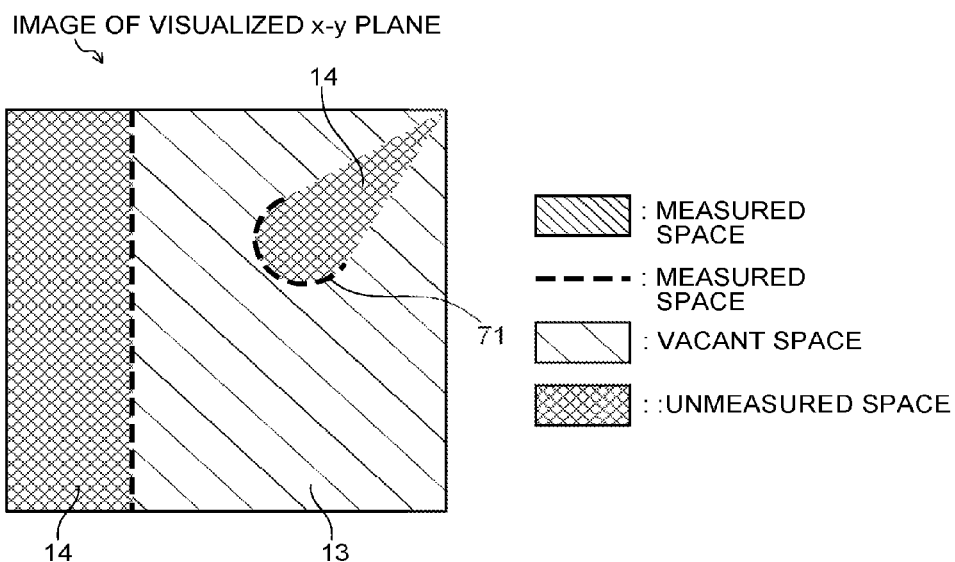
FIG. 8B is a view illustrating a planar image made by visualizing a space in the search range of the "x-y plane $(0 \leq z \leq a1)$".

FIG. 8A is an example of a stereoscopic image with the search direction 62 set in the direction normal to the x-y plane and the search range 61 set to 0≤z≤a1 regarding the measuring range 41, and FIG. 8B is an example of a planar image made by projecting the stereoscopic image of FIG. 8A in the search direction and thereby visualizing it.

Figure 9A:
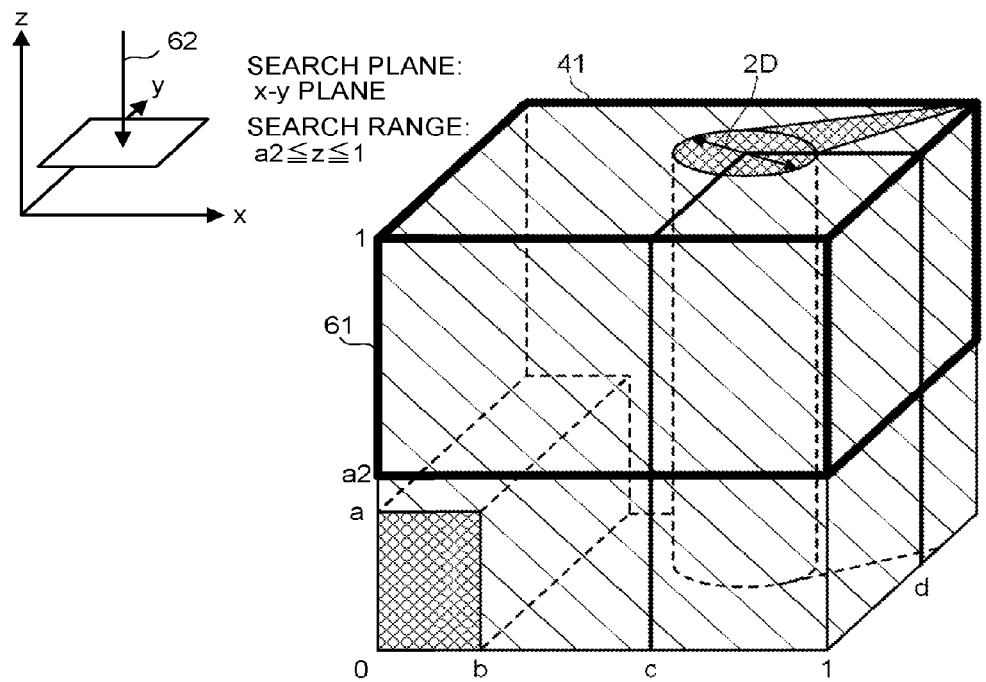
FIG. 9A is a view illustrating a classification result (a stereoscopic image) in a search range of an "x-y plane $(a2 \leq z \leq 1)$".
Figure 9B:
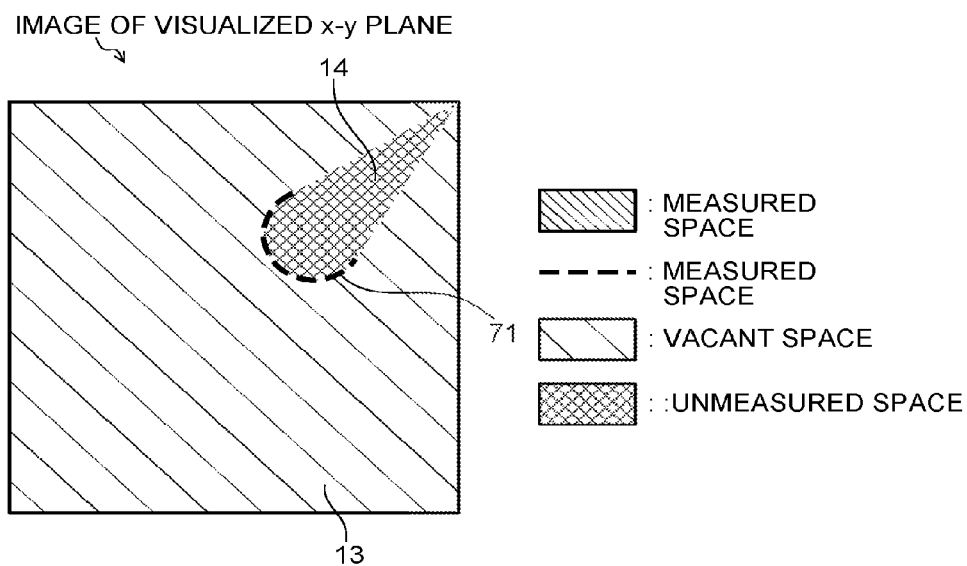
FIG. 9B is a view illustrating a planar image made by visualizing a space in the search range of the "x-y plane $(a2 \leq z \leq 1)$".

FIG. 9A is an example of a stereoscopic image with the search direction 62 set in the direction normal to the x-y plane and the search range 61 set to a2≤z≤1 regarding the measuring range 41, and FIG. 9B is an example of a planar image made by projecting the stereoscopic image of FIG. 9A in the search direction.

Figure 10A:
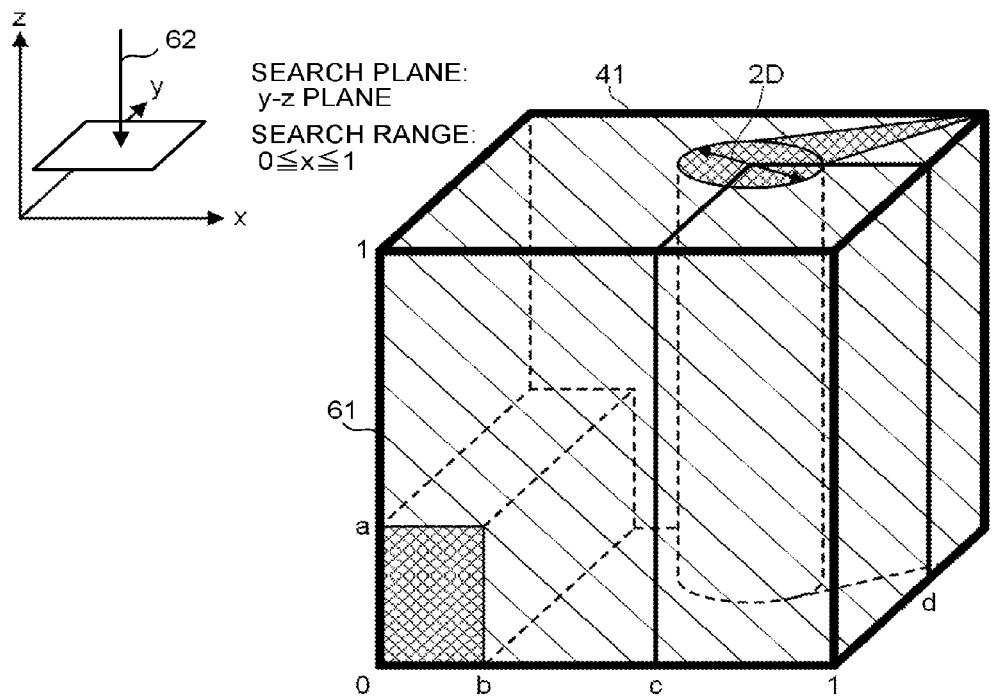
FIG. 10A is a view illustrating a classification result (a stereoscopic image) in a search range of a "y-z plane $(0 \leq x \leq 1)$".
Figure 10B:
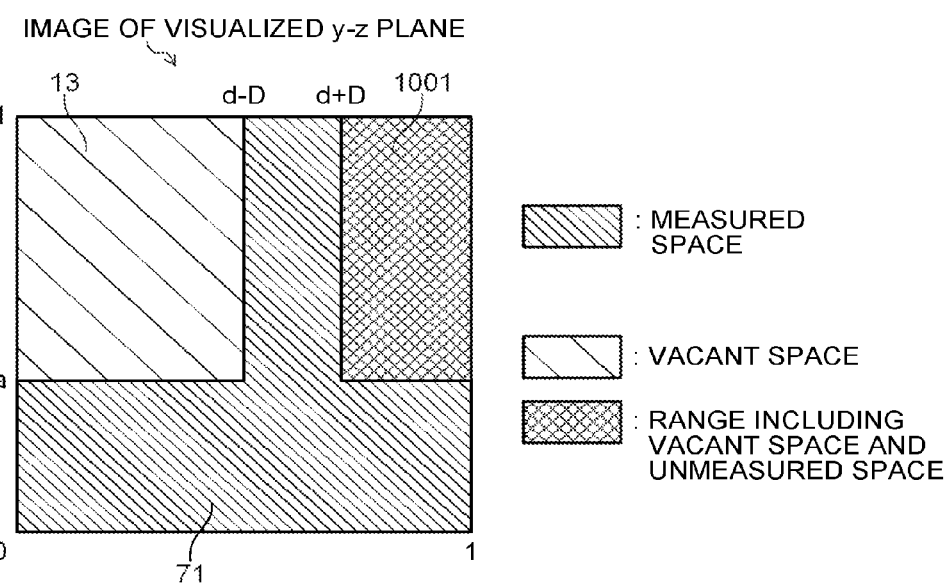
FIG. 10B is a view illustrating a planar image made by visualizing a space in the search range of the "y-z plane $(0 \leq x \leq 1)$".

FIG. 10A is an example of a stereoscopic image with the search direction 62 set in the direction normal to the y-z plane and the search range 61 set to 0≤x≤1 regarding the measuring range 41, and FIG. 10B is an example of a planar image made by projecting the stereoscopic image of FIG. 10A in the search direction and thereby visualizing it.

Figure 11A:
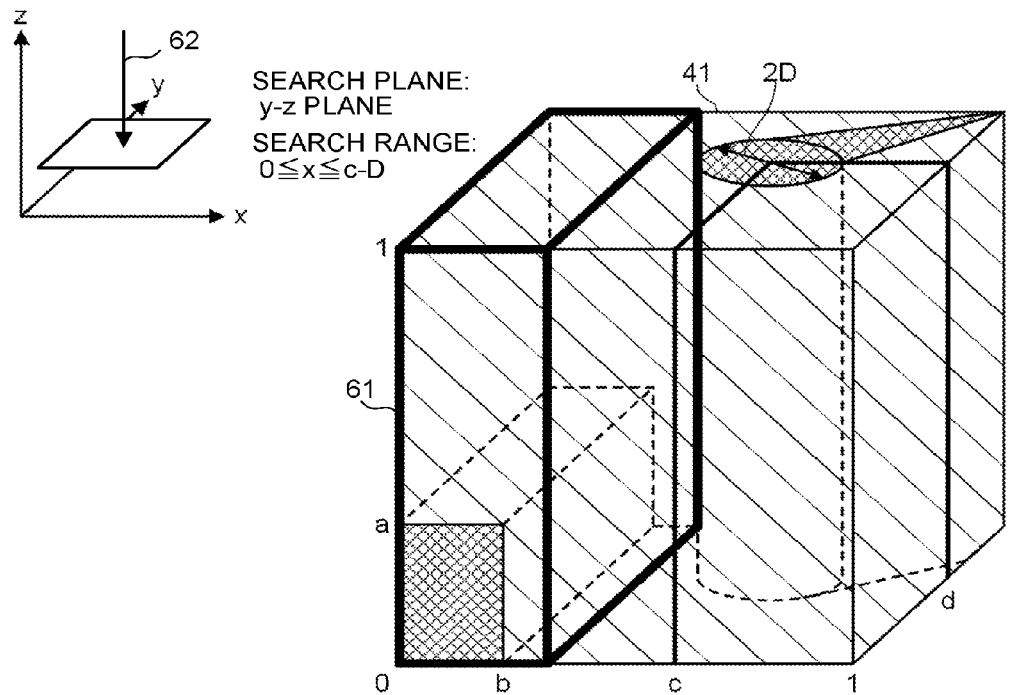
FIG. 11A is a view illustrating a classification result (a stereoscopic image) in a search range of a "y-z plane $(0 \leq x \leq c-D)$".
Figure 11B:
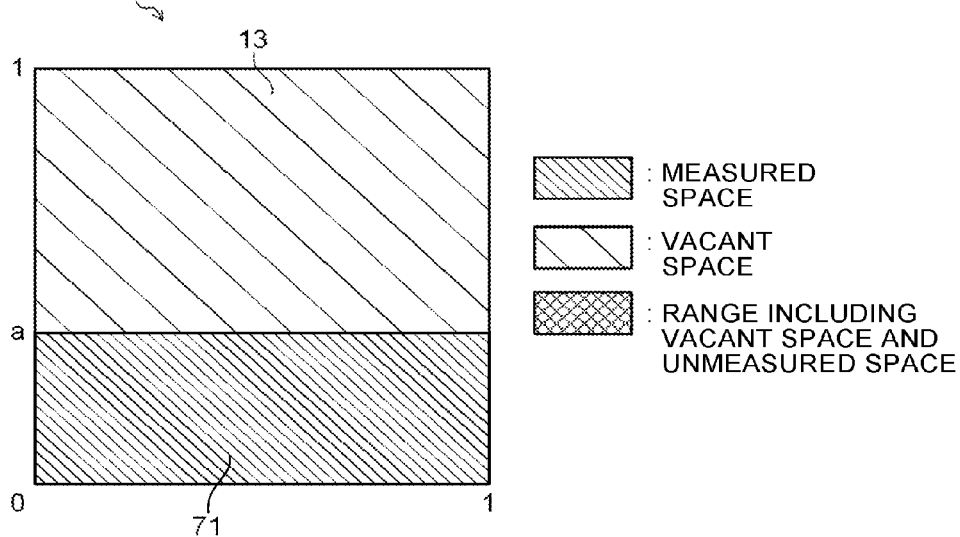
FIG. 11B is a view illustrating a planar image made by visualizing a space in the search range of the "y-z plane (0≤x≤c−D)".

FIG. 11A is an example of a stereoscopic image with the search direction 62 set in the direction normal to the y-z plane and the search range 61 set to 0≤x≤c−D regarding the measuring range 41, and FIG. 11B is an example of a planar image made by projecting the stereoscopic image of FIG. 11A in the search direction. A symbol D represents the radius of the cylindrical shield.

Figure 12A:
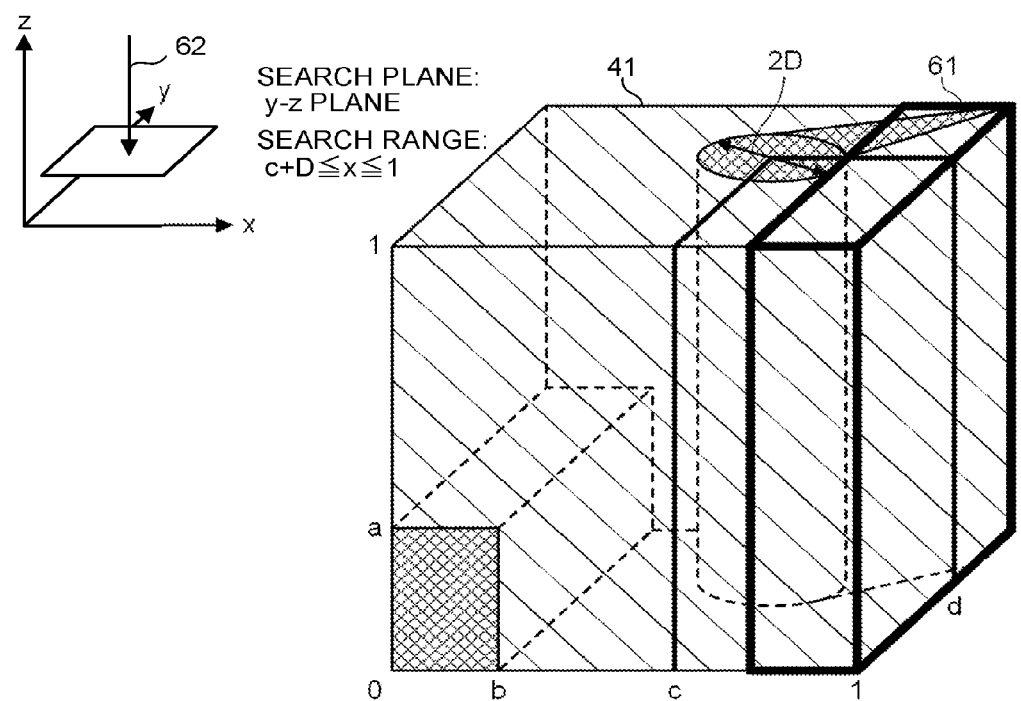
FIG. 12A is a view illustrating a classification result (a stereoscopic image) in a search range of a "y-z plane (c+D≤x≤1)".
Figure 12B:
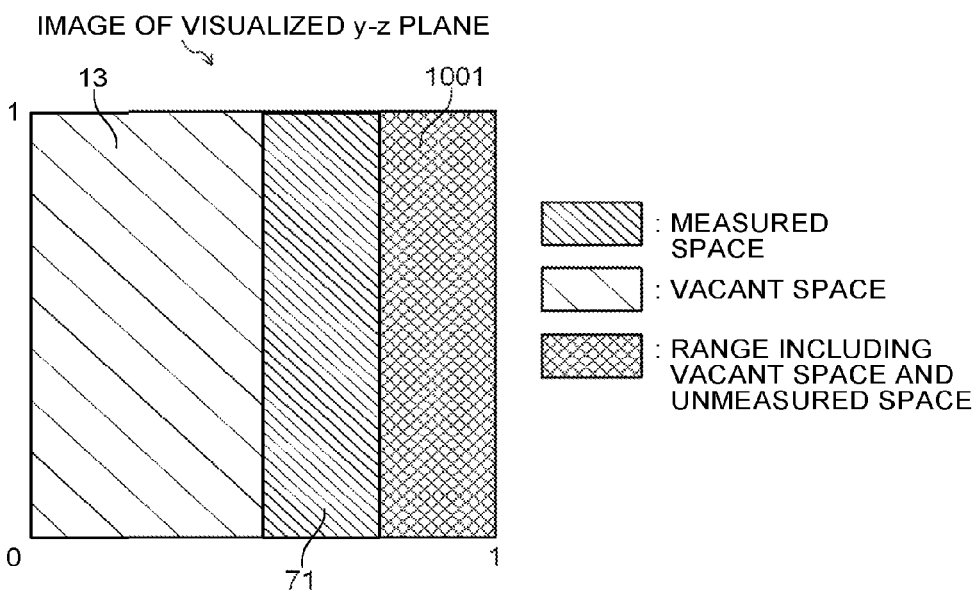
FIG. 12B is a view illustrating a planar image made by visualizing a space in the search range of the "y-z plane (c+D≤x≤1)".

FIG. 12A is an example of a stereoscopic image with the search direction 62 set in the direction normal to the y-z plane and the search range 61 set to c+D≤x≤1 regarding the measuring range 41, and FIG. 12B is an example of a planar image made by projecting the stereoscopic image of FIG. 12A in the search direction and thereby visualizing it.

As illustrated in FIG. 7A to FIG. 12B respectively, the inside of the search range 61 is classified and visualized in the above four kinds, whereby the operator who views the visualized image on the screen of the display 7 can accurately grasp the position of the vacant space 13 in the search range 61.

Visualizing the vacant space 13 while designating the range of the measurement object as described above makes it possible to visually determine, by human eyes, the state of an object settling therein and whether or not the object can pass therethrough.

Here, a method of causing the PC 2 to determine the state of an object (object to be determined) 1301 settling in the vacant space 13 and whether or not the object can pass therethrough will be described referring to FIG. 13A to FIG. 13C and FIG. 14A to FIG. 14C.

Figure 13A:
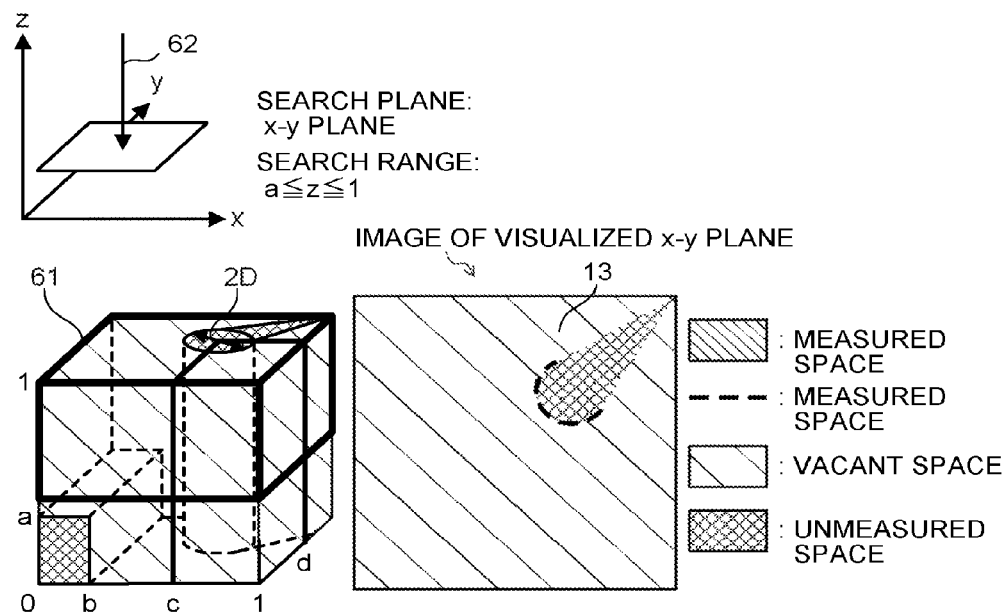
FIG. 13A is a view illustrating a space for which the arrangement of an object is examined.

As illustrated in FIG. 13A, the state of the object (object to be determined) 1301 settling in the range determined as the vacant space 13 in the search range 61 and whether or not the object can pass therethrough are determined. Note that the unmeasured space 14 is a range that is possibly handled as the vacant space 13 by further measurement.

Example 1

Figure 13B:
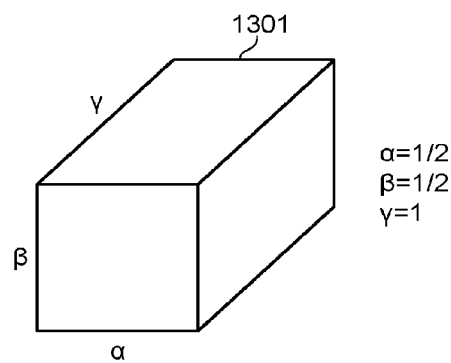
FIG. 13B is a view illustrating the object (object to be determined) which is to be arranged in the space.

As Example 1, in the case where the object (object to be determined) 1301 in a shape of a rectangular parallelepiped (width α=½, height β=½, depth γ=1 as outside dimensions) as illustrated in FIG. 13B is set in the search range 61, the object (object to be determined) 1301 is disposed to settle in the range of the vacant space 13 while the position of the object (object to be determined) 1301 is changed regarding the search range 61 from the spatial information in FIG. 7 to FIG. 12.

As a result, as illustrated in FIG. 13C, two patterns are obtained: a first pattern A in which the object (object to be determined) 1301 is disposed with the depth γ directed in the y-axis direction with respect to the planar image projected on the x-y plane; and a second pattern B in which the object (object to be determined) 1301 is disposed with the depth γ directed in the x-axis direction with respect to the planar image projected on the x-y plane.

Example 2

Figure 14B:
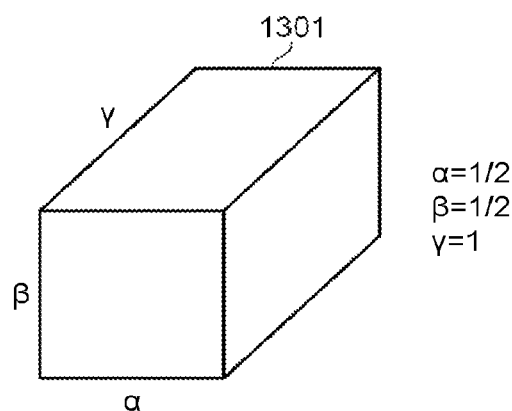
FIG. 14B is a view illustrating the object (object to be determined) which is to be made to pass through the space.
Figure 14C:
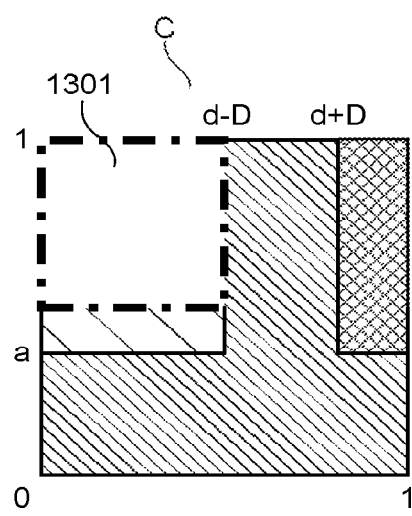
FIG. 14C is a view illustrating the passing route of the object (object to be determined).

As Example 2, a method of obtaining a passing route when an object (object to be determined) in a shape of a rectangular parallelepiped (width α=½, height β=½, depth γ=1 as outside dimensions) is desired to pass in the direction normal to the y-z plane in the search range 61 is illustrated in FIG. 14A to FIG. 14C.

As illustrated in FIG. 14A, in the case of the search direction 62: the direction normal to the y-z plane and the search range 61: 0≤x≤1 regarding a target space, it is found that the passing route of an object (object to be determined) 1301 in the shape of the rectangular parallelepiped (width α=½, height β=½, depth γ=1 as outside dimensions) as illustrated in FIG. 14B becomes one pattern C illustrated in FIG. 14C.

As described above, according to the first embodiment, the trajectory of laser of the three-dimensional measuring device 3 is obtained from the three-dimensional shape data (spatial information) obtained by the three-dimensional measuring device 3, the three-dimensional space in which the part with the trajectory is measured as the vacant space 13 is distinguished, and when the planar image or the stereoscopic image is generated while the search range and the search direction in the three-dimensional space are designated, the measured space 12 where the physical body exists in the space and the vacant space 13 are colored and thereby recognizably visualized, whereby the spatial information in the measuring range can be accurately expressed in a short time. As a result, it becomes possible to easily determine the state of the object (object to be determined) 1301 position in the target space being the measurement object and whether or not the object (object to be determined) 1301 can pass therethrough.

Second Embodiment

A second embodiment of a spatial information visualization system will be described referring to FIG. 15 to FIG. 22. Note that the same configurations as those in the first embodiment are denoted by the same symbols and their description will be omitted. In this second embodiment, a space will be segmented in a grid shape and handled in units of cells.

For describing the second embodiment, the definitions of terms of a space in which an object exists will be explained first referring to FIG. 15.

Figure 15:
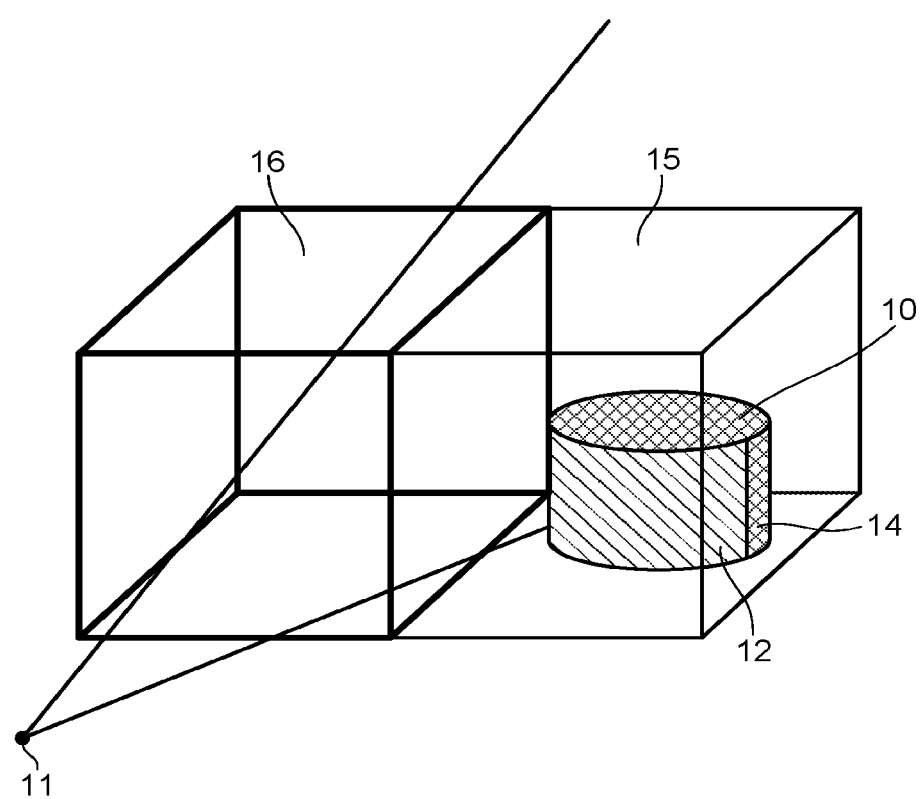
FIG. 15 is a view illustrating the definition of a cell as one unit of a space grid.

As illustrated in FIG. 15, one piece obtained by dividing a predetermined space (a measuring target space) by an arbitrary size (fineness) in a grid shape is called a cell 15. The cell 15 through which laser has passed between the measuring position 11 and the measured space 12 measured in a non-contact manner is called a vacant cell 16. A cell in which the obstacle 10 exists, namely, the cell 15 including the measured space 12 is not called the vacant cell 16. A range for which a sum set of the vacant cells 16 is obtained, namely, a set of the vacant cells 16 is called a vacant space.

Figure 16:
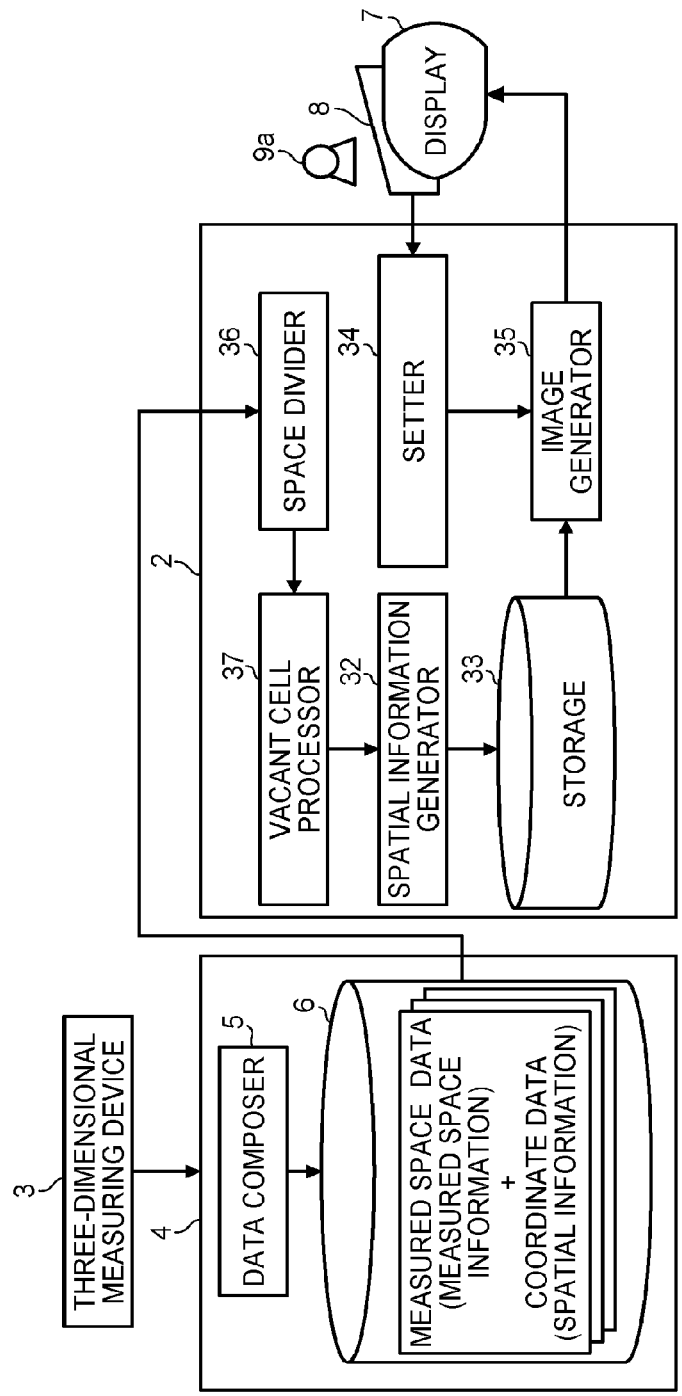
FIG. 16 is a block diagram illustrating the configuration of a second embodiment of a spatial information visualization system.

As illustrated in FIG. 16, the second embodiment has a space divider 36 and a vacant cell processor 37.

The space divider 36 finely divides a space being a measuring target space with a predetermined fineness and thereby divides the measuring target space into units of cells. The vacant cell processor 37 specifies the vacant cell in which the obstacle 10 does not exist in the unit of a cell and obtains a sum set of the vacant cells at reference positions (reference points) to thereby specify a range in which the vacant cells exist, as a vacant space.

Figure 17:
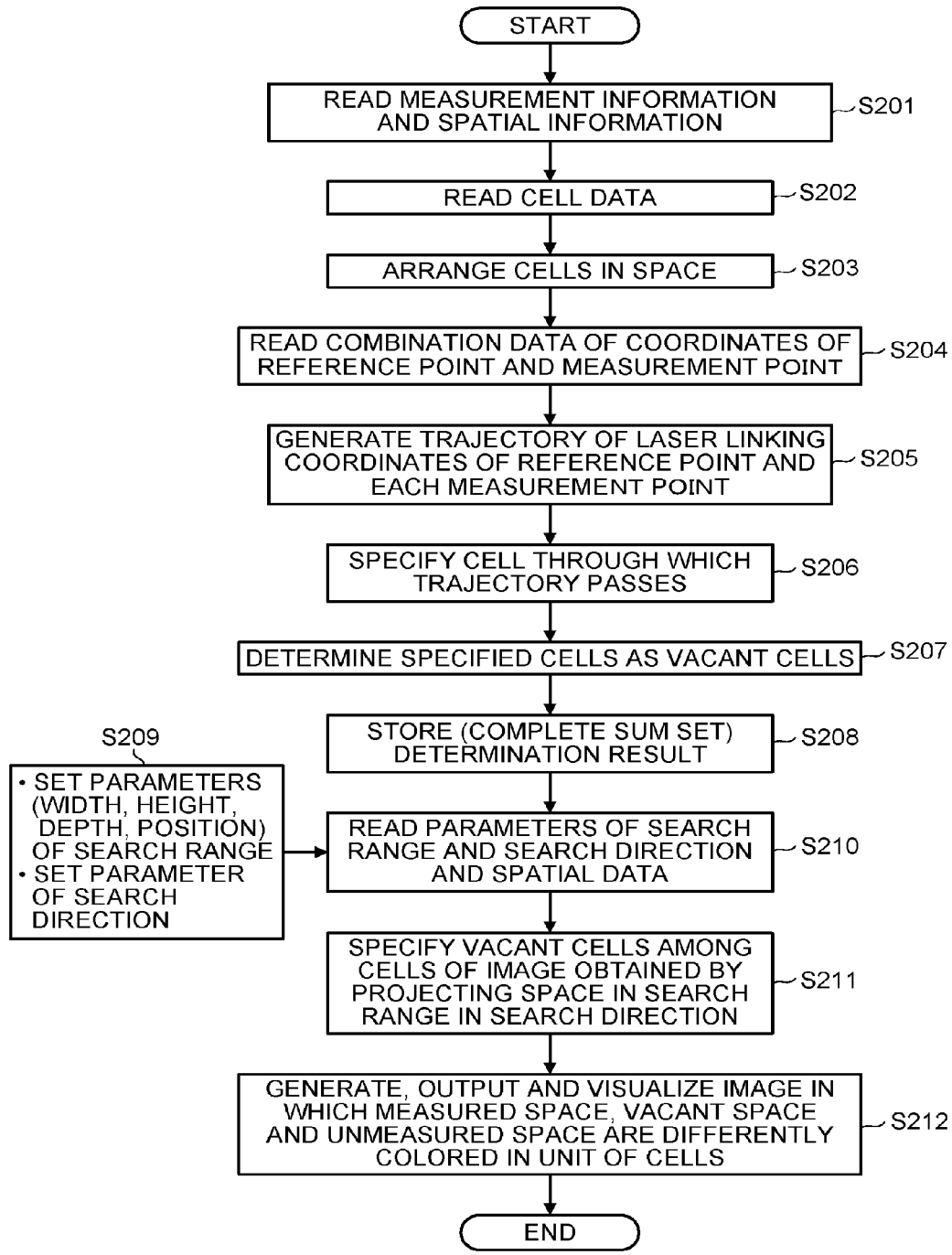
FIG. 17 is a flowchart illustrating an operation in the second embodiment.

Hereinafter, a processing operation in the second embodiment will be described referring to FIG. 17 to FIG. 22. FIG. 17 is a flowchart of dividing three-dimensional shape data in a grid shape into cells, and specifying a vacant cell in the unit of a cell until specifying a vacant space being a sum set of vacant cells and visualizing it.

In the PC 2, the space divider 36 reads the measurement data and the coordinate data (measuring information) and the three-dimensional shape data (spatial information) in the measuring range (Step S201).

Subsequently, the space divider 36 reads setting information of the cells (the fineness at which the target space is divided, and the size of the cell and the like) set in advance in the memory or the like from the memory (Step S202).

Figure 18:
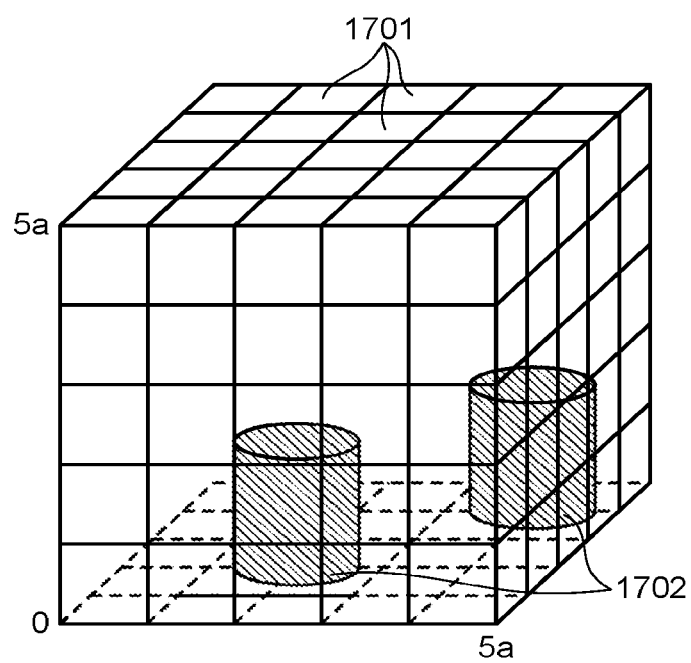
FIG. 18 is a view of a measuring range divided into cells in an arbitrary size.

On the basis of the setting information of the cells read from the memory, the space divider 36 divides the measuring range in which physical bodies 1702 such as a structure, an instrument and the like exist, in a grid shape according to the setting information of the cells as illustrated in FIG. 18 to generate a plurality of cells 1701 (Step S203).

Next, the vacant cell processor 37 reads, from the DB 6, combination data of the coordinates of the reference position (reference point) and the measurement point (Step S204), and generates the trajectory of laser linking the reference position (reference point) and the measurement point (Step S205). The trajectory may be one line or may be a shape (conical shape or the like) having a width in consideration of diffusion of the laser.

The vacant cell processor 37 specifies the coordinates of the cell on the three-dimensional shape data (spatial information) through which the generated trajectory passes (Step S206). The vacant cell processor 37 adds the attribute information (a flag or tag) such as the vacant cell to the cell positioned at the specified coordinates.

Figure 19A:
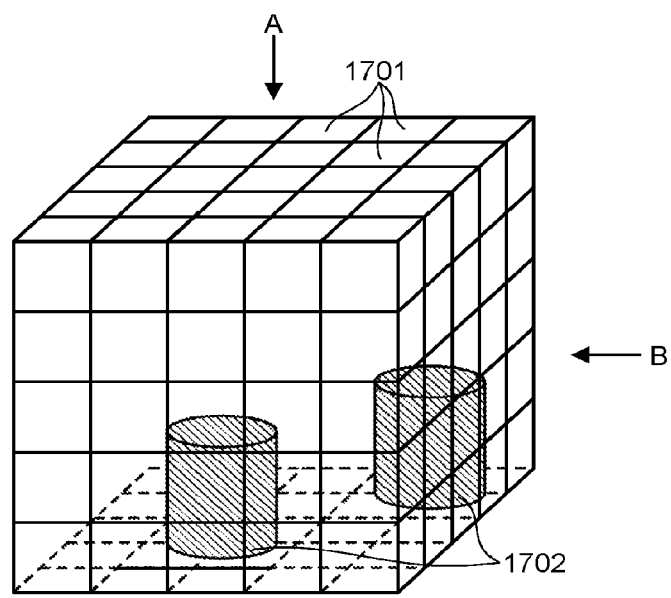
FIG. 19A is a view illustrating a stereoscopic image illustrating a range determined as vacant cells in the measuring range.
Figure 19B:
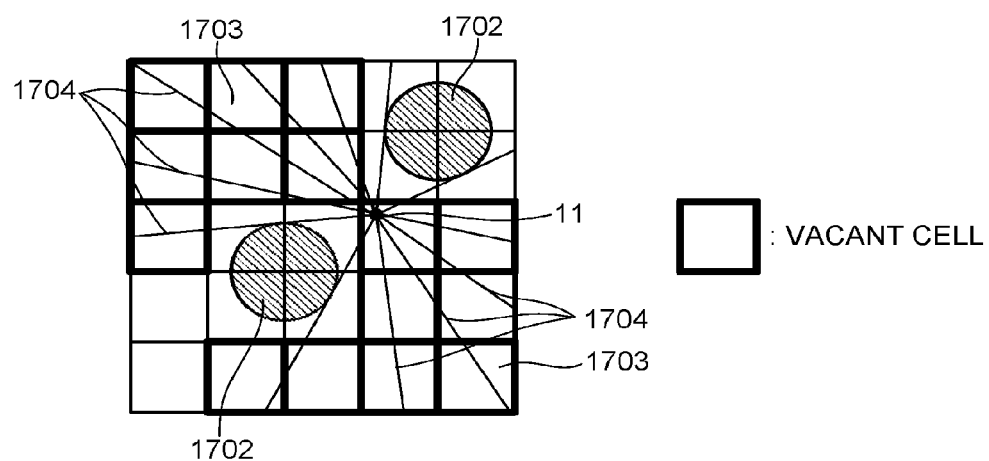
FIG. 19B is a view illustrating a planar image made by projecting a range determined as the vacant cells from an A-direction in FIG. 19A.
Figure 19C:
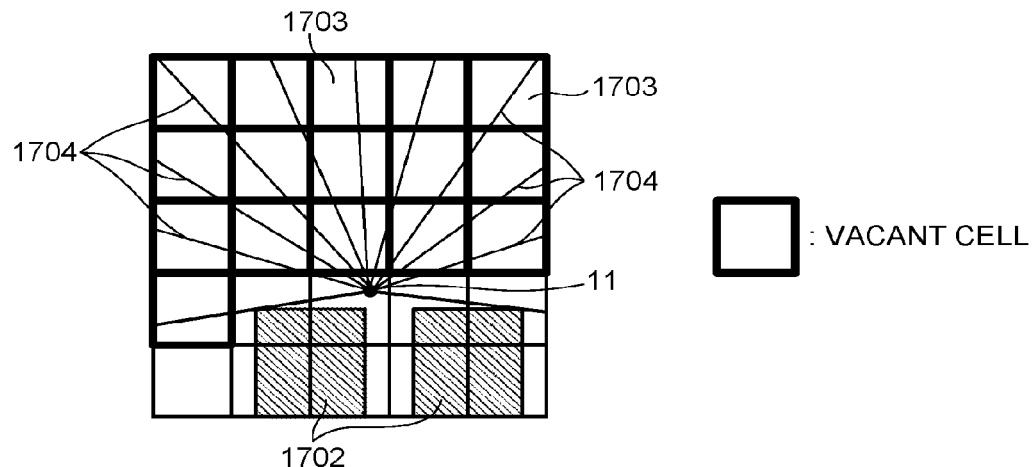
FIG. 19C is a view illustrating a planar image made by projecting the range determined as the vacant cells from a B-direction in FIG. 19A.

More specifically, in the case where the measurement object is the space in the measuring range in which the physical bodies 1702 exist as illustrated in FIG. 19A, the vacant cell processor 37 obtains trajectories 1704 through which laser has passed between the measuring position 11 and the measured space 12 measured in a non-contact manner as illustrated in FIG. 19B, FIG. 19C.

Then, the vacant cell processor 37 determines that the cells 1701 in which the coordinates of the obtained trajectories 1704 are included as vacant cells 1703.

When the measured space 12 (for example, a point group or the like) exists in the cell 1701, the vacant cell processor 37 does not determine the cell 1701 as the vacant cell 1703. Note that by measuring the same space from a plurality of different measuring positions 11 to increase the trajectories of laser, the number of vacant cells 1703 can be increased.

The vacant cell processor 37 performs the operation of specifying the vacant cells 1703 sequentially also for other measurement positions, and determines the range for which a sum set of the vacant cells 1703 having the specified coordinates is obtained, as the vacant space 13 (see FIG. 20) (Step S207).

The vacant cell processor 37 stores (completes a sum set) the three-dimensional shape data (spatial information) to which the attribute information of the determined vacant space 13 is imparted as the determination result of the vacant space, in the storage 33 (Step S208).

Figure 20:
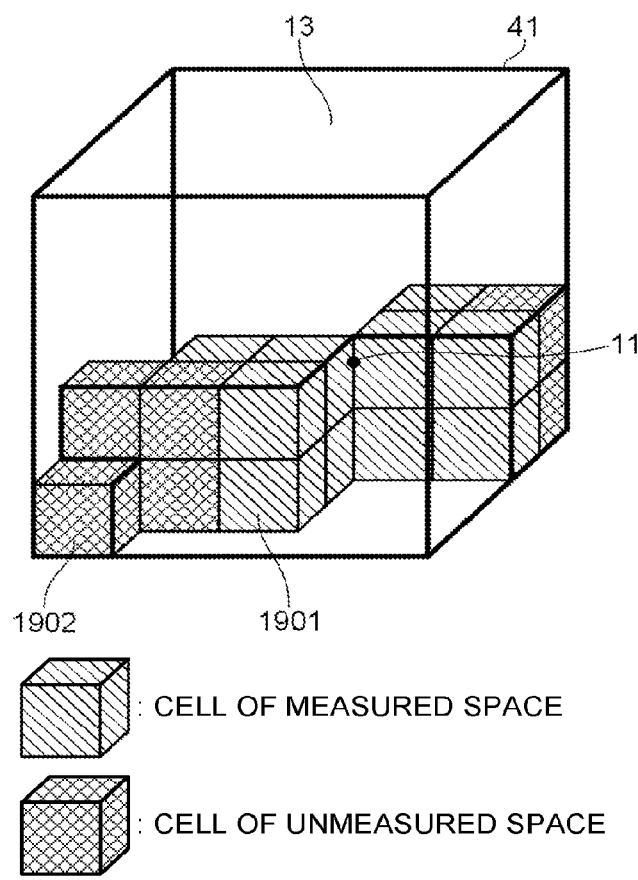
FIG. 20 is a view illustrating a stereoscopic image illustrating a range of a vacant space by obtaining a sum set of vacant cells in the measuring range from a measurement result.

In short, in this processing, by obtaining a sum set of data of the specified vacant cells 1703, the vacant space 13 in the measuring range 41 is specified as illustrated in FIG. 20. In this event, cells 1901 in which the measurement point exist, the vacant space 13, and cells 1902 representing the unmeasured space are drawn with different colors and thereby visualized, thereby enabling the ranges (regions) to be recognized by human eyes.

Next, in the case of visualizing the three-dimensional shape data (spatial information) to which the information of the vacant space 13 is imparted, the search range and the search direction (search plane) are designated and set (Step S209).

In this case, when the designer 9a inputs, for example, values of the width, height depth, position and the like as parameters of the search range from the input device 8, designates and inputs, for example, the x-y plane as a parameter of the search direction, and sets the search range and the search direction (search plane) in the PC 2.

Then, in the PC 2, the image generator 35 reads the parameters of the search range and the search direction (search plane) and the three-dimensional shape data (spatial information) (Step S210), and decides the search range and the search direction in the three-dimensional shape data (spatial information).

Here, by designating the plane to be searched in an arbitrary direction and the search range from the input device 8 regarding the measuring range 41 illustrated in FIG. 20, the setter 34 sets the search direction 62 to the x-y plane and the search range 61 such as "0" to "5a" as illustrated in FIG. 21.

Here, the search direction 62 is a direction normal to the set plane, and is the z-axis direction (height) in the case of this example. Further, regarding the search range 61, a range (two ranges, the lower end and the upper end in the case of the height direction) can be set along the search direction 62 (in the direction normal to the set plane) in the measuring range 14.

Then, the image generator 35 obtains a product set of vacant cells 1903 in the decided search direction 62 to thereby calculate the place (width of the height) of the vacant space 13 along the search direction 62 in the search range 61, and specifies pixels being the vacant cells 1903 in the planar image made by projecting the place (width of the height) in the search direction 62 (Step S211).

The image generator 35 generates an image of the planar image in the search range in which the measured space 12, the vacant space 13, and the unmeasured space 14 are differently colored (colored with different colors), on the basis of the specified pixels (cells), and outputs the generated image to the display 7 (Step S110). The image generator 35 thereby displays the colored image on the screen of the display 7 to thereby visualize it.

Then, the image generator 35 obtains a product set of the specified vacant space 13 in the search direction 62 as illustrated in FIG. 21 to thereby calculate the place (width of the height) of the vacant cells 1903 along the search direction 62 in the search range 61, and specifies pixels (cells) being the vacant cells 1903 in the planar image made by projecting the place (width of the height) in the search direction 62 (Step S211).

Figure 22A:
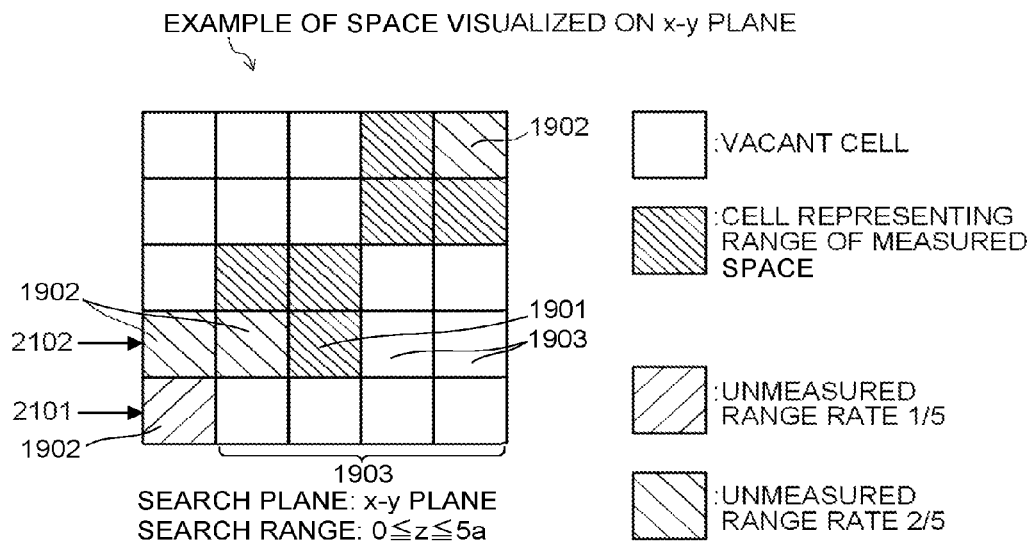
FIG. 22A is a view illustrating a planar image visualized by obtaining a product set of the vacant cells in a search direction (x-y plane) regarding the search range in FIG. 21.

The image generator 35 generates a planar image in which the vacant cells 1903, the cell 1902 of the unmeasured space, and the cells 1901 in which measured space exist are differently colored for the search range of "0" to "5a" in the z-axis direction as illustrated in FIG. 22A, on the basis of the thus specified pixels (cells), and outputs the generated planar image to the display 7 and thereby visualizes it (Step S212).

Figure 22B:
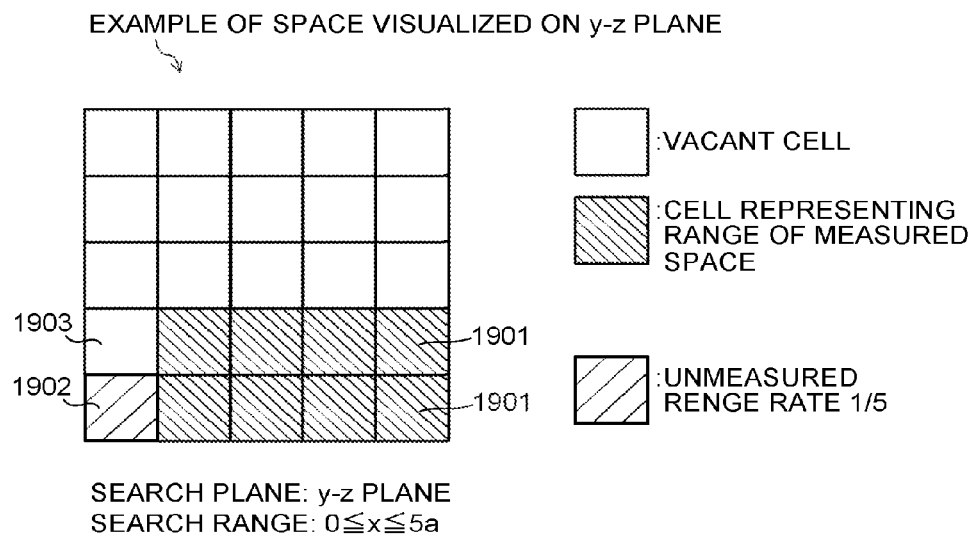
FIG. 22B is a view illustrating a planar image visualized by obtaining a product set of the vacant cells in a search direction (y-z plane) regarding the search range in FIG. 21.

FIG. 22A is an example that the search direction 62 is set in the direction normal to the x-y plane and the search range 61 is set to $0 \leq z \leq 5a$. In addition, when the search direction 62 is set in the y-z plane, the cells 1901 to 1903 are drawn with different colors and lines in a search range of $0 \leq x \leq 5a$ as illustrated in FIG. 22B and thereby visualized.

When the vacant cells 1903 and the cells 1902 being the unmeasured space exist in the search direction 62, their ranges are distinguished from each other by performing visualization according to the ratio between the vacant cells 1903 and the cells 1902 being the unmeasured space.

For example, in a line 2101 illustrated in FIG. 22A in the space in the search range 61 illustrated in FIG. 21, four vacant cells 1903 and one cell 1902 representing the unmeasured space among five cells in one line exist, showing that an unmeasured range rate is ⅕.

In a line 2102 of cells on the line 2101, two vacant cells 1903, one cell 1901 representing existence of a measured space, and two cells representing the unmeasured space 1903 exist, showing that an unmeasured range rate is ⅖.

Visualizing the vacant space 13 in the search range 61 with a color different from those of other ranges makes it possible to visually determine the state of an object settling therein and whether or not the object can pass therethrough.

As described above, according to the second embodiment, by dividing the measurement range in a grid shape to generate cells and specifying the cell through which the trajectory obtained from the measurement data passes as a vacant cell, information processing volume becomes extremely small as compared with the first embodiment, so that the vacant space can be speedily and surely visualized.

Third Embodiment

Figure 23:
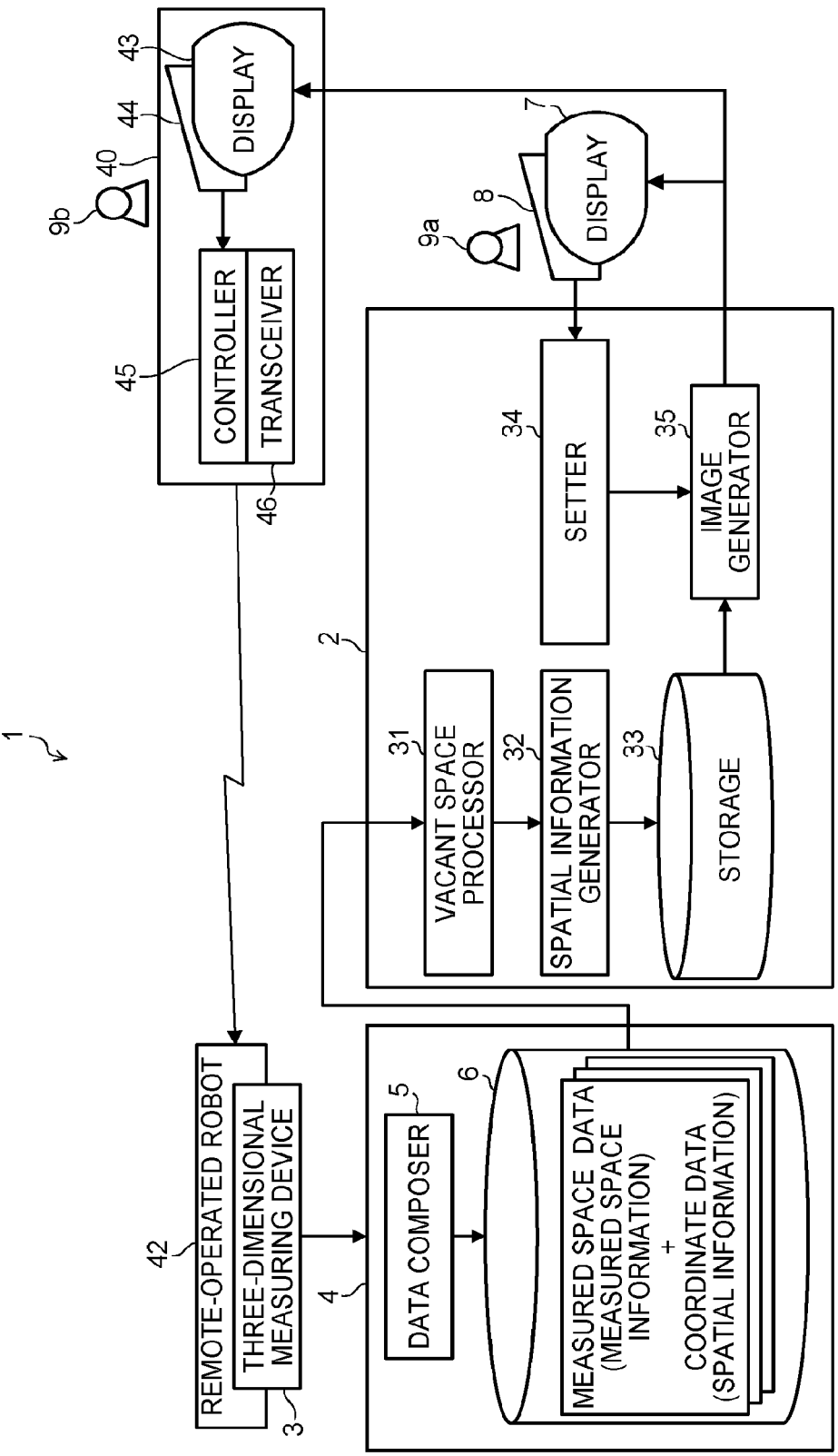
FIG. 23 is a block diagram illustrating the configuration of a third embodiment of a spatial information visualization system.

A third embodiment of a spatial information visualization system will be described referring to FIG. 23 to FIG. 26. Note that in the third embodiment, the same configurations as those in the first embodiment and the second embodiment are denoted by the same symbols and their description will be omitted. FIG. 23 is a diagram illustrating the configuration of the third embodiment of the spatial information visualization system.

As illustrated in FIG. 23, the third embodiment includes a remote-operated robot 42 as a mobile robot on which the three-dimensional measuring device 3 is mounted, and a remote operation apparatus 40 that remotely operates the remote-operated robot 42.

Figure 24A:
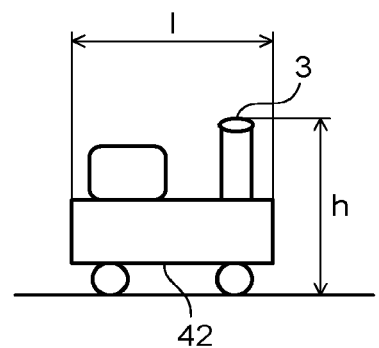
FIG. 24A is a side view illustrating outline dimensions of a remote-operated robot.
Figure 24B:
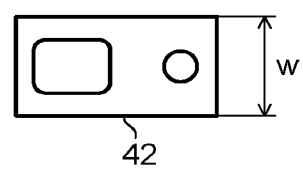
FIG. 24B is a top view illustrating the outline dimensions of the remote-operated robot.

The remote-operated robot 42 is configured such that the three-dimensional measuring device 3 is mounted on an electrically operated cart as illustrated in FIG. 24A and FIG. 24B, and has dimensions (external shape data) of a height h, a total length 1, and a total width w.

The external shape data shall be stored in advance in a memory of a controller 45 of the remote operation apparatus 40. Note that FIG. 24A is a side view of the remote-operated robot 42, and FIG. 24B is a top view thereof.

The remote operation apparatus 40 has a transceiver 46 as a communicator, the controller 45, a display 43, an input device 44 and so on.

The input device 44 is, for example, a lever-operating type operation device of a radio control operating gear (a radio control transmitter), and with which a remote operator 9b operates or gives an instruction for calculating a moving route.

The transceiver 46 communicates with the remote-operated robot 42 by wireless communication. Note that the remote operation apparatus 40 and the remote-operated robot 42 may be connected with each other via a communication cable and communicate with each other by cable.

The controller 45 calculates, in response to the instruction from the input device 44, the moving route on which the remote operation apparatus 40 can pass through the vacant space 13 (second range) (see FIG. 26), on the basis of the outer shape data of the remote-operated robot 42 in the memory and the three-dimensional shape data of the space including the vacant space 13 reported from the PC 2, and gives an instruction about the calculated moving route to the remote-operated robot 42 via the transceiver 46.

Note that the calculation of the moving route may be performed on the PC 2 side, and the moving route as the calculation result may be reported from the PC 2 to the remote operation apparatus 40. Further, the remote operator 9b may determine the moving route from the image of the vacant space 13 displayed on the display 43, and perform an instruction operation from the input device 44.

Figure 25:
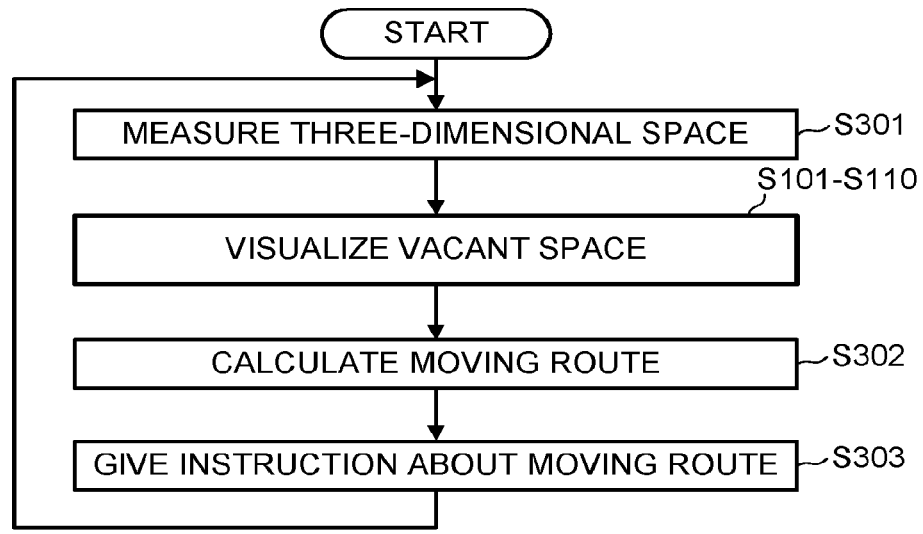
FIG. 25 is a flowchart illustrating an operation in the third embodiment.

Hereinafter, a processing operation in the third embodiment will be described referring to FIG. 25 to FIG. 26. FIG. 25 is a flowchart of specifying the vacant space 13 from the measured data measured by the three-dimensional measuring device 3 installed in the remote-operated robot 42, imparting an attribute to the three-dimensional shape data (spatial information) to specify the position of the vacant space 13 in the search range 61, until determining whether or not the remote-operated robot 42 can pass therethrough.

In this case, the remote-operated robot 42 is moved to the measurement position in the three-dimensional space being the measurement object, and the three-dimensional measuring device 3 mounted on the remote-operated robot 42 measures the three-dimensional space to obtain measurement data (Step S301 in FIG. 25).

Then, the data synthesis unit 5 of the three-dimensional data processing device 4 performs coordinate conversion and synthesis on the measurement data obtained by the three-dimensional measuring device 3 to generate three-dimensional shape data (spatial information), and stores it in the DB 6.

In the PC 2, the processing procedure described in the first embodiment is executed to visualize the measurement range including the vacant space 13 as a planar image (Steps S101 to S110). For visualizing the target space, not only the planar image but also the image as it is in the three-dimensional shape (called a stereoscopic image or a spatial image) may be generated and thereby visualized.

In more detail, the three-dimensional shape data (spatial information) is read from the DB 6, the range from the measuring position 11 to the measured space 12 measured in a non-contact manner is specified as the vacant space 13 and made into data. Note that it is possible that the remote-operated robot 42 is moved to other positions, and measurement is performed a plurality of times to increase the vacant space 13.

By obtaining a sum set of the vacant space 13 in the measuring range 41, the vacant space 13 is specified. Then, regarding the measuring range 41, the plane is set in an arbitrary direction and the search direction 62 is set. Further, along the direction normal to the plane, the search range 61 is set. Then, by obtaining a product set of the specified spaces in the search direction 62, the place (the width in the height direction when the search range is the x-y plane) of the vacant space 13 along the search direction 62 in the search range 61 is calculated, and the space in the search range 61 including the vacant space 13 is visualized.

Subsequently, the controller 45 calculates, in response to the instruction from the input device 44, the moving route on which the remote operation apparatus 40 can pass through the vacant space 13 (second range) (see FIG. 26), on the basis of the outer shape data of the remote-operated robot 42 in the memory and the three-dimensional shape data of the space including the vacant space 13 reported from the PC 2 (Step S302).

Then, the controller 45 gives an instruction about the calculated moving route to the remote-operated robot 42 via the transceiver 46 (Step S303).

Note that in the case where the vacant space 13 through which the remote-operated robot 42 can pass does not exist and therefore the remote-operated robot 42 cannot pass therethrough, the setting of the search direction 62 and the search range 61 is reviewed, and information on a new space is acquired.

In the case where passage is possible based on the determination whether passage is possible or not, the remote-operated robot 42 moves, and after the movement, three-dimensional measuring is performed at the new measuring position 11 as necessary, the vacant space 13 is specified, and calculation of the moving route is repeatedly performed.

Figure 26:
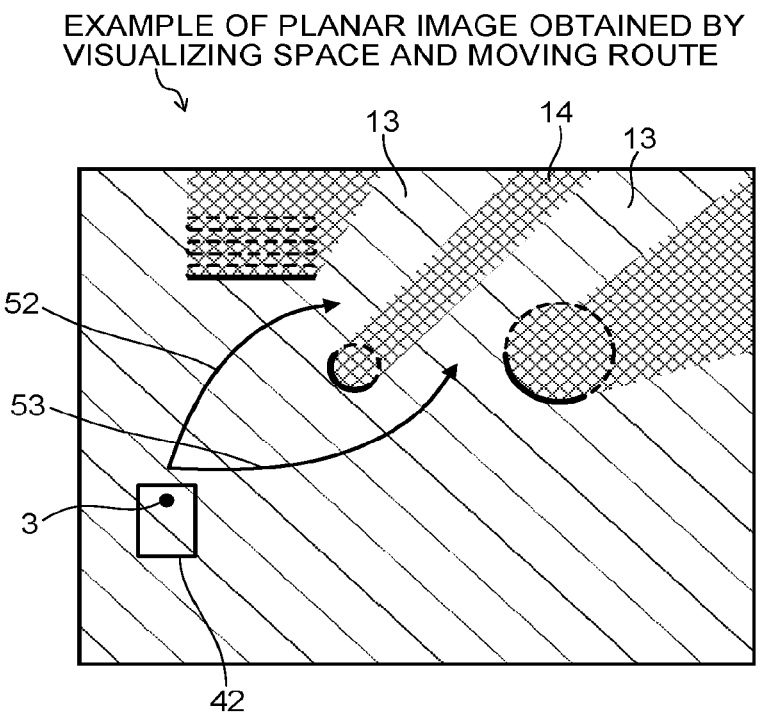
FIG. 26 is a view illustrating a moving route by the remote-operated robot with a three-dimensional measuring device mounted thereon.

In this manner, visualization of the space including the vacant space 13 and visualization of calculated moving routes 52, 53 are performed at the measuring position 11 to which the remote-operated robot 42 has moved as illustrated in FIG. 26, thereby enabling the remote operator 9b to visually determine whether or not the remote-operated robot 42 can pass therethrough while operating the remote operation apparatus 40.

As described above, according to the third embodiment, by, while moving the remote-operated robot 42 in the space with the three-dimensional measuring device 3 mounted thereon, stopping the remote-operated robot 42 at a desired measuring position 11, and measuring the space and visualizing the space including the vacant space 13, and visualizing the calculated moving routes 52, 53 at the same time, whether or not the remote-operated robot 42 can pass therethrough can be visually determined.

Further, the remote-operated robot 42 can be used such that it is moved to a desired place while measuring the three-dimensional shape data of the space on site and caused to perform operations there.

The space including the vacant space 13 is visualized using the measurement data measured by the three-dimensional measuring device 3 in the above embodiment, and besides the vacant space 13 may be specified and the space may be visualized by the same method as those in the first embodiment to the third embodiment on the basis of the data obtained, for example, using the conventional three-dimensional CAD model reconfiguration technique.

Further, though the measurement information and the spatial information are stored in the DB 6 of the three-dimensional data processing device 4 in the above embodiments, the measurement information and the spatial information may be stored in the hard disk drive of the PC 2.

Further, the components illustrated in the above embodiments may be realized by a program installed in a storage such as the hard disk drive of the computer, or the above program may be stored in computer-readable electronic media and read by the computer from the computer-readable electronic media so that the computer realizes the functions of the present invention. Examples of the electronic media include recording media such as CD-ROM, flash memory, removable media and the like. Further, the components may be stored in a distribution manner in different computers connected with each other via a network and realized by communication between the computers functioning as the components.

More specifically, a storage medium may store a program for causing a computer to function as: a storage storing design dimensions of a target space, and measurement information indicating coordinates of a measurement point of the target space measured by scanning the target space from a plurality of different reference points in the target space, for each of the reference points; a vacant space processor specifying a vacant space existing in the measured space stored in the storage, on the basis of the coordinates of the measurement point of the target space included in the measurement information read for each of the reference points from the storage, coordinates of the reference point, and the design dimensions of the space; a spatial information generator generating spatial information for classifying the target space into the measured space, the vacant space, and an unmeasured space ranging from the design dimensions of the target space to the measurement point of the target space; and an image generator generating a stereoscopic image or a planar image of at least the vacant space in the spatial information visually distinguished from the measured space and/or the unmeasured space in the spatial information.

The vacant space processor generates a trajectory linking the coordinates of the measurement point of the target space included in the measurement information read for each of the reference points from the storage and the coordinates of the reference point, specifies a space through which the generated trajectory has passed, and obtains a sum set of the specified spaces to thereby specify a range in which the spaces exist, as the vacant space.

The vacant space processor finely divides the target space with a predetermined fineness and thereby divides the space into cells, specifies a vacant cell in which a obstacle does not exist in the unit of a cell, and obtains a sum set of vacant cells to thereby specify a range in which the vacant cells exist, as the vacant space.

The image generator generates a stereoscopic image or a planar image in which at least the vacant space among the measured space, the vacant space, and the unmeasured space is visually distinguished from the other space, by partially taking out the spatial information or projecting the spatial information on a predetermined plane according to designated search range and search direction.

The image generator generates a three-dimensional image or a two-dimensional image in which the measured space, the vacant space, and the unmeasured space are visually distinguished from one another by drawing the measured space, the vacant space, and the unmeasured space with different colors and/or lines.

The storage medium further stores a program for causing the computer to function as a controller gives an instruction about a moving route calculated for the mobile robot to pass through the vacant space to a mobile robot on which a space scanner is mounted, by cable communication or by wireless communication.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A spatial information visualization apparatus, comprising:
   a storage storing design dimensions of a target space, and measurement information indicating coordinates of a measurement point of the target space measured by scanning the target space from a plurality of different reference points in the target space, for each of the reference points;
   a vacant space processor specifying a vacant space existing in the measured space stored in the storage, on the basis of the coordinates of the measurement point of the target space included in the measurement information read for each of the reference points from the storage, coordinates of the reference point, and the design dimensions of the space;
   a spatial information generator generating spatial information for classifying the target space into the measured space, the vacant space, and an unmeasured space ranging from the design dimensions of the target space to the measurement point of the target space; and
   an image generator generating a stereoscopic image or a planar image of at least the vacant space in the spatial information visually distinguished from the measured space and/or the unmeasured space in the spatial information, the image generator generating a three-dimensional image or a two-dimensional image indicating the measured space, the vacant space, and the unmeasured space visually distinguished from one another by drawing the measured space, the vacant space, and the unmeasured space with different colors and/or lines.

2. The spatial information visualization apparatus of claim 1,
   wherein the vacant space processor generates a trajectory linking the coordinates of the measurement point of the target space included in the measurement information read for each of the reference points from the storage and the coordinates of the reference point, specifies a space through which the generated trajectory has passed, and obtains a sum set of the specified spaces to thereby specify a range in which the spaces exist, as the vacant space.

3. The spatial information visualization apparatus of claim 1,
   wherein the vacant space processor divides the target space with a predetermined fineness and thereby divides the space into cells, specifies a vacant cell in which an obstacle does not exist in the unit of a cell, and obtains a sum set of vacant cells to thereby specify a range in which the vacant cells exist, as the vacant space.

4. The spatial information visualization apparatus of claim 1,
   wherein the image generator generates a stereoscopic image or a planar image in which at least the vacant space among the measured space, the vacant space, and the unmeasured space is visually distinguished from the other space, by partially taking out the spatial information or projecting the spatial information on a predetermined plane according to designated search range and search direction.

5. The spatial information visualization apparatus of claim 1, further comprising:
   a mobile robot on which a space scanner is mounted;
   a communicator communicating with the mobile robot by cable or by wireless communication; and
   a controller giving the mobile robot an instruction about a moving route calculated for the mobile robot to pass through the vacant space, via the communicator.

6. A spatial information visualization method, comprising:
   storing design dimensions of a target space, and measurement information indicating coordinates of a measurement point of the target space measured by scanning the target space from a plurality of different reference points in the target space, for each of the reference points;
   specifying a vacant space existing in the stored measured space, on the basis of the coordinates of the measurement point of the target space included in the stored measurement information for each of the reference points, coordinates of the reference point, and the design dimensions of the target space;
   generating spatial information for classifying the target space into the measured space, the vacant space, and an unmeasured space ranging from the design dimensions of the target space to the measurement point of the target space; and
   generating a stereoscopic image or a planar image of at least the vacant space in the spatial information visually distinguished from the measured space and/or the unmeasured space in the spatial information, the stereoscopic image or a planar image having a three-dimensional image or a two-dimensional image indicating the measured space, the vacant space, and the unmeasured space visually distinguished from one another by drawing the measured space, the vacant space, and the unmeasured space with different colors and/or lines.

7. The spatial information visualization method of claim 6, further comprising:
   generating a trajectory linking the coordinates of the measurement point of the target space included in the measurement information and the coordinates of the reference point;
   specifying a space through which the generated trajectory has passed; and obtaining a sum set of the specified spaces to thereby specify a range in which the spaces exist, as the vacant space.

8. The spatial information visualization method of claim 6, further comprising
   dividing the target space with a predetermined fineness and thereby divides the space into cells;
   specifying a vacant cell in which an obstacle does not exist in the unit of a cell; and
   obtaining a sum set of vacant cells to thereby specify a range in which the vacant cells exist, as the vacant space.

9. The spatial information visualization method of claim 6, further comprising
   generating a stereoscopic image or a planar image in which at least the vacant space among the measured space, the vacant space, and the unmeasured space is visually distinguished from the other space, by partially taking out the spatial information or projecting the spatial information on a predetermined plane according to designated search range and search direction.

10. The spatial information visualization method of claim 6, further comprising giving an instruction about a moving route calculated for the mobile robot to pass through the vacant space to a mobile robot on which a space scanner is mounted, by cable communication or by wireless communication.

11. A non-transitory computer-readable storage medium storing a program for causing a computer to function as:
a storage storing design dimensions of a target space, and measurement information indicating coordinates of a measurement point of the target space measured by scanning the target space from a plurality of different reference points in the target space, for each of the reference points;
a vacant space processor specifying a vacant space existing in the measured space stored in the storage, on the basis of the coordinates of the measurement point of the target space included in the measurement information read for each of the reference points from the storage, coordinates of the reference point, and the design dimensions of the space;
a spatial information generator generating spatial information for classifying the target space into the measured space, the vacant space, and an unmeasured space ranging from the design dimensions of the target space to the measurement point of the target space; and
an image generator generating a stereoscopic image or a planar image of at least the vacant space in the spatial information visually distinguished from the measured space and/or the unmeasured space in the spatial information, the image generator generating a three-dimensional image or a two-dimensional image indicating the measured space, the vacant space, and the unmeasured space visually distinguished from one another by drawing the measured space, the vacant space, and the unmeasured space with different colors and/or lines.

12. The non-transitory computer-readable storage medium of claim 11,
wherein the vacant space processor generates a trajectory linking the coordinates of the measurement point of the target space included in the measurement information read for each of the reference points from the storage and the coordinates of the reference point, specifies a space through which the generated trajectory has passed, and obtains a sum set of the specified spaces to thereby specify a range in which the spaces exist, as the vacant space.

13. The non-transitory computer-readable storage medium of claim 11,
wherein the vacant space processor divides the target space with a predetermined fineness and thereby divides the space into cells, specifies vacant cell in which an obstacle does not exist in the unit of a cell, and obtains a sum set of vacant cells to thereby specify a range in which the vacant cells exist, as the vacant space.

14. The non-transitory computer-readable storage medium of claim 11,
wherein the image generator generates a stereoscopic image or a planar image in which at least the vacant space among the measured space, the vacant space, and the unmeasured space is visually distinguished from the other space, by partially taking out the spatial information or projecting the spatial information on a predetermined plane according to designated search range and search direction.

15. The non-transitory computer-readable storage medium of claim 11 further storing a program for causing the computer to function as:

a controller giving an instruction about a moving route calculated for the mobile robot to pass through the vacant space to a mobile robot on which a space scanner is mounted, by cable communication or by wireless communication.

16. A spatial information visualization apparatus, comprising:
a storage storing design dimensions of a target space, and measurement information indicating coordinates of a measurement point of the target space measured by scanning the target space from a plurality of different reference points in the target space, for each of the reference points;
a vacant space processor specifying a vacant space existing in the measured space stored in the storage, on the basis of the coordinates of the measurement point of the target space included in the measurement information read for each of the reference points from the storage, coordinates of the reference point, and the design dimensions of the space;
a spatial information generator generating spatial information for classifying the target space into the measured space, the vacant space, and an unmeasured space ranging from the design dimensions of the target space to the measurement point of the target space; and
an image generator generating a stereoscopic image or a planar image of at least the vacant space in the spatial information visually distinguished from the measured space and/or the unmeasured space in the spatial information,
wherein the vacant space processor divides the target space with a predetermined fineness and thereby divides the space into cells, specifies a vacant cell in which an obstacle does not exist in the unit of a cell, and obtains a sum set of vacant cells to thereby specify a range in which the vacant cells exist, as the vacant space.

17. A spatial information visualization method, comprising:
storing design dimensions of a target space, and measurement information indicating coordinates of a measurement point of the target space measured by scanning the target space from a plurality of different reference points in the target space, for each of the reference points;
specifying a vacant space existing in the stored measured space, on the basis of the coordinates of the measurement point of the target space included in the stored measurement information for each of the reference points, coordinates of the reference point, and the design dimensions of the target space;
generating spatial information for classifying the target space into the measured space, the vacant space, and an unmeasured space ranging from the design dimensions of the target space to the measurement point of the target space;
generating a stereoscopic image or a planar image of at least the vacant space in the spatial information visually distinguished from the measured space and/or the unmeasured space in the spatial information;
dividing the target space with a predetermined fineness and thereby divides the space into cells;
specifying a vacant cell in which an obstacle does not exist in the unit of a cell; and
obtaining a sum set of vacant cells to thereby specify a range in which the vacant cells exist, as the vacant space.

18. A non-transitory computer-readable storage medium storing a program for causing a computer to function as:
- a storage storing design dimensions of a target space, and measurement information indicating coordinates of a measurement point of the target space measured by scanning the target space from a plurality of different reference points in the target space, for each of the reference points;
- a vacant space processor specifying a vacant space existing in the measured space stored in the storage, on the basis of the coordinates of the measurement point of the target space included in the measurement information read for each of the reference points from the storage, coordinates of the reference point, and the design dimensions of the space;
- a spatial information generator generating spatial information for classifying the target space into the measured space, the vacant space, and an unmeasured space ranging from the design dimensions of the target space to the measurement point of the target space; and
- an image generator generating a stereoscopic image or a planar image of at least the vacant space in the spatial information visually distinguished from the measured space and/or the unmeasured space in the spatial information,
- wherein the vacant space processor divides the target space with a predetermined fineness and thereby divides the space into cells, specifies a vacant cell in which an obstacle does not exist in the unit of a cell, and obtains a sum set of vacant cells to thereby specify a range in which the vacant cells exist, as the vacant space.

* * * * *